Aug. 30, 1932.　　　C. W. GREEN　　　1,874,285
CASH REGISTER
Filed April 13, 1927　　8 Sheets-Sheet 1

Inventor
Charles W. Green
By
A. A. Klick
Attorney

Aug. 30, 1932.    C. W. GREEN    1,874,285
CASH REGISTER
Filed April 13, 1927    8 Sheets-Sheet 2
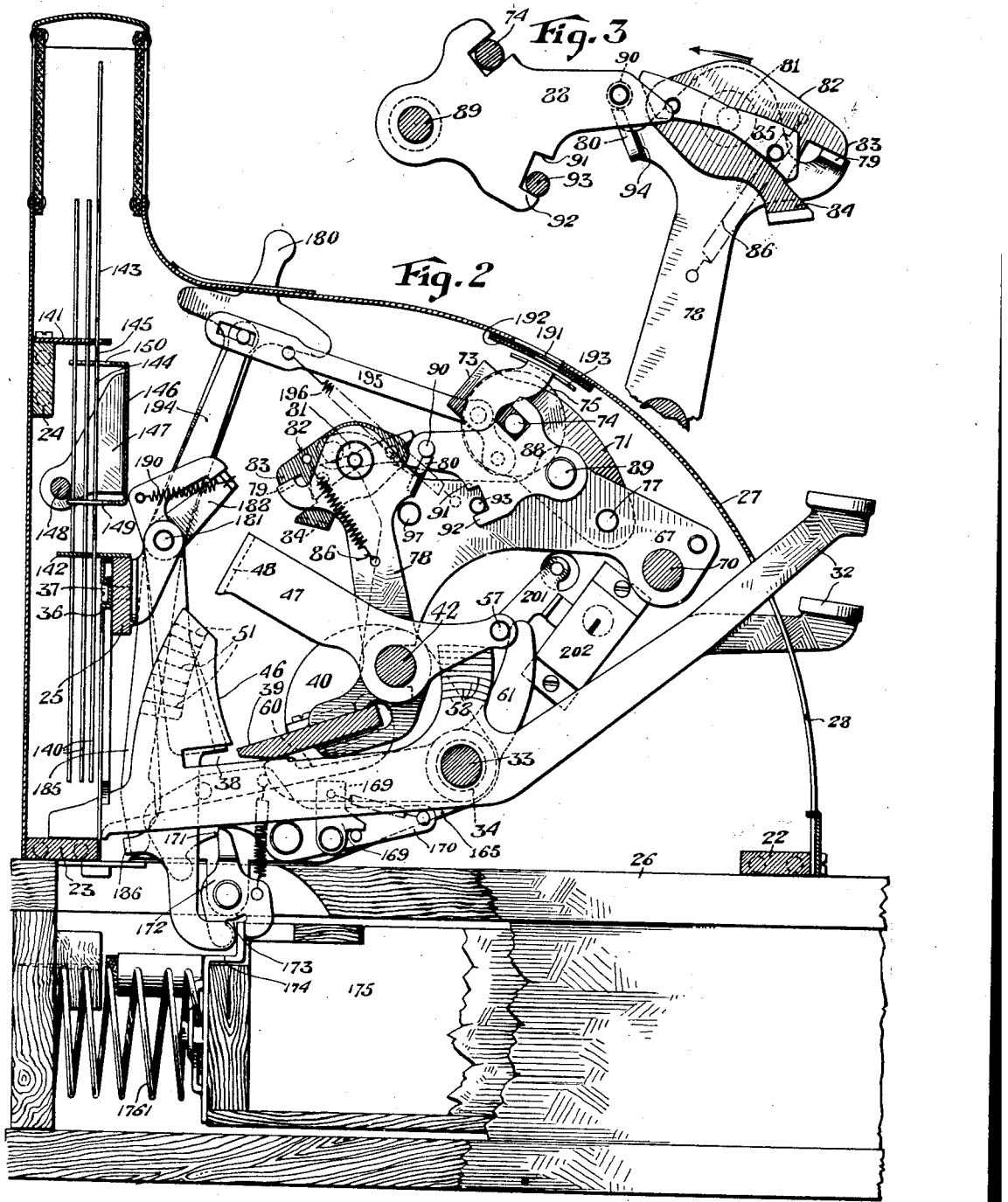
Inventor
Charles W. Green,
By
A. A. Hicks
Attorney

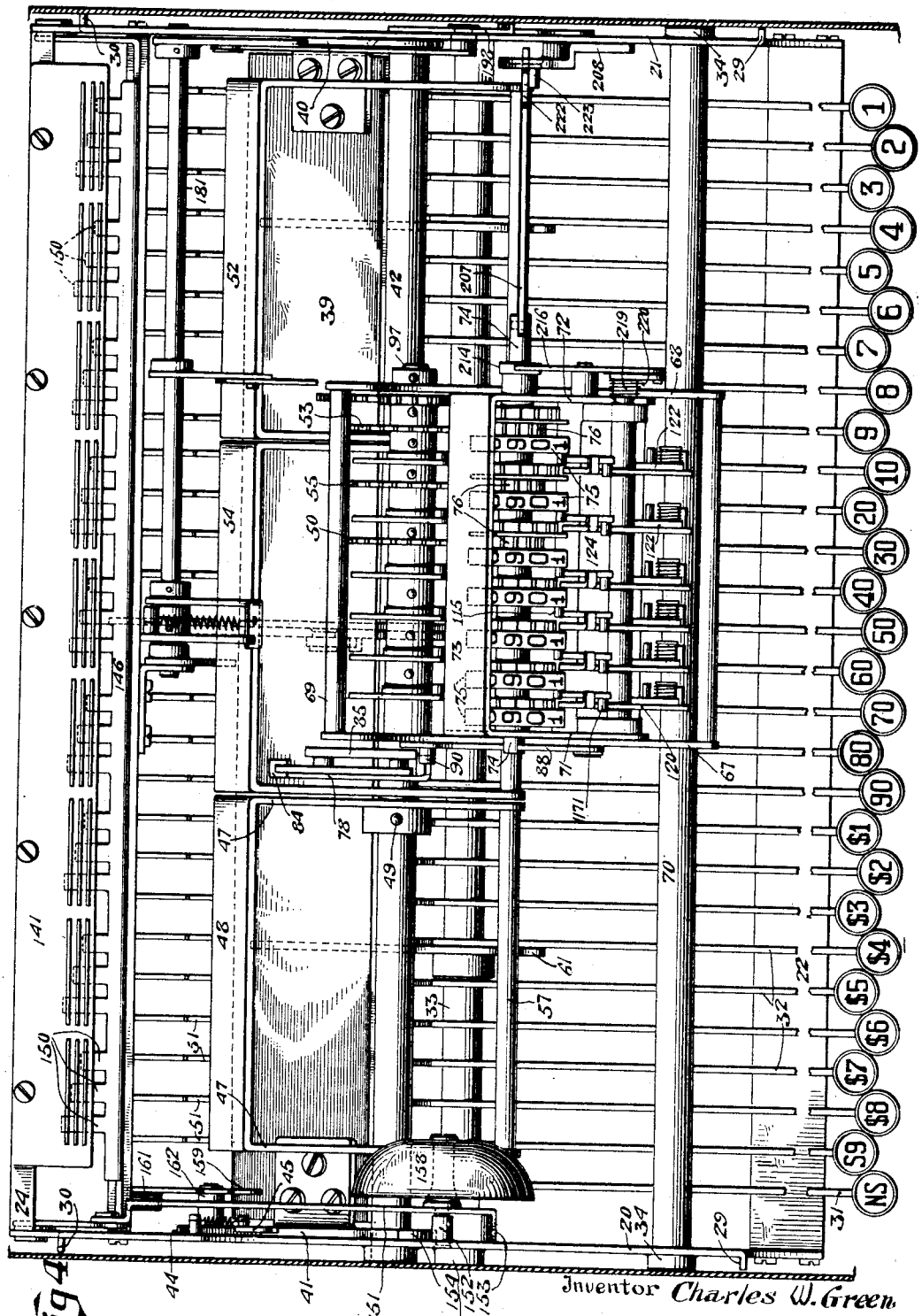

Aug. 30, 1932.  C. W. GREEN  1,874,285
CASH REGISTER
Filed April 13, 1927   8 Sheets-Sheet 4
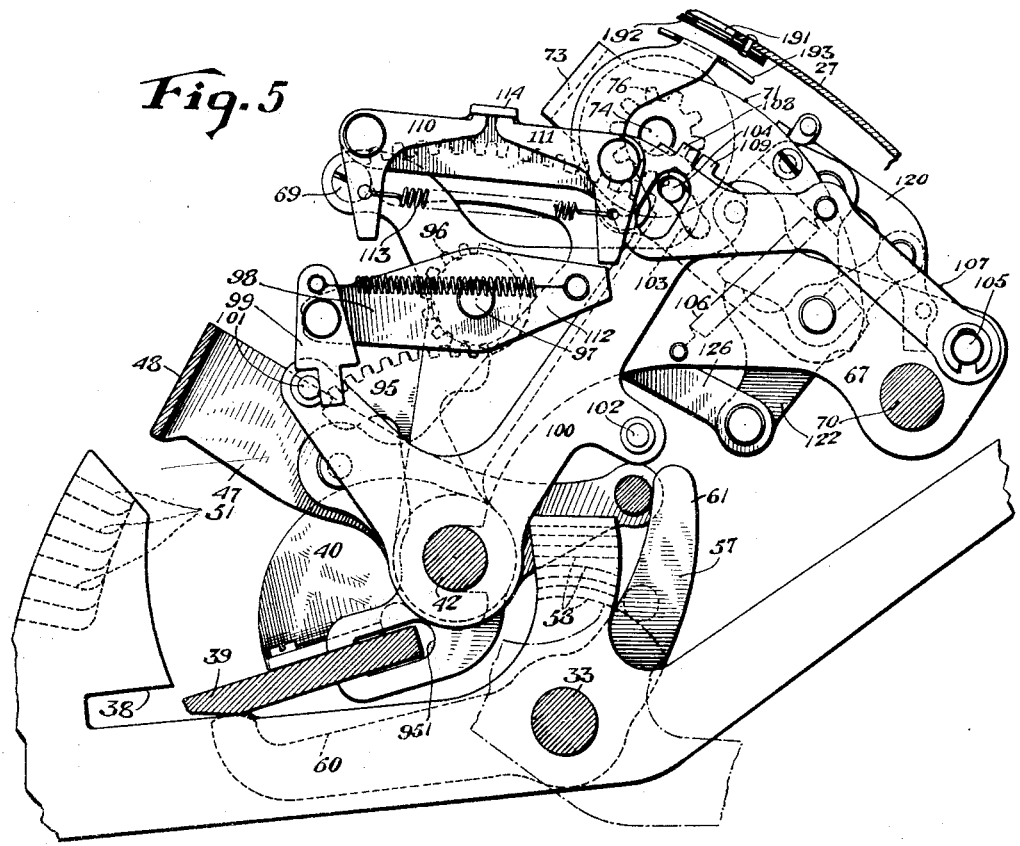
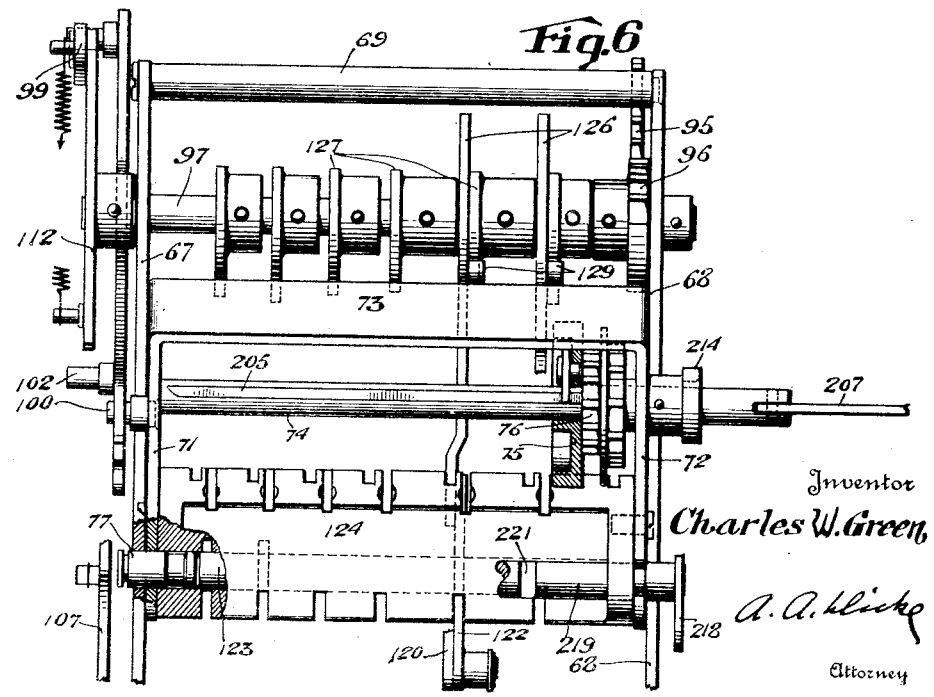
Inventor
Charles W. Green,
A. A. Klicke
Attorney

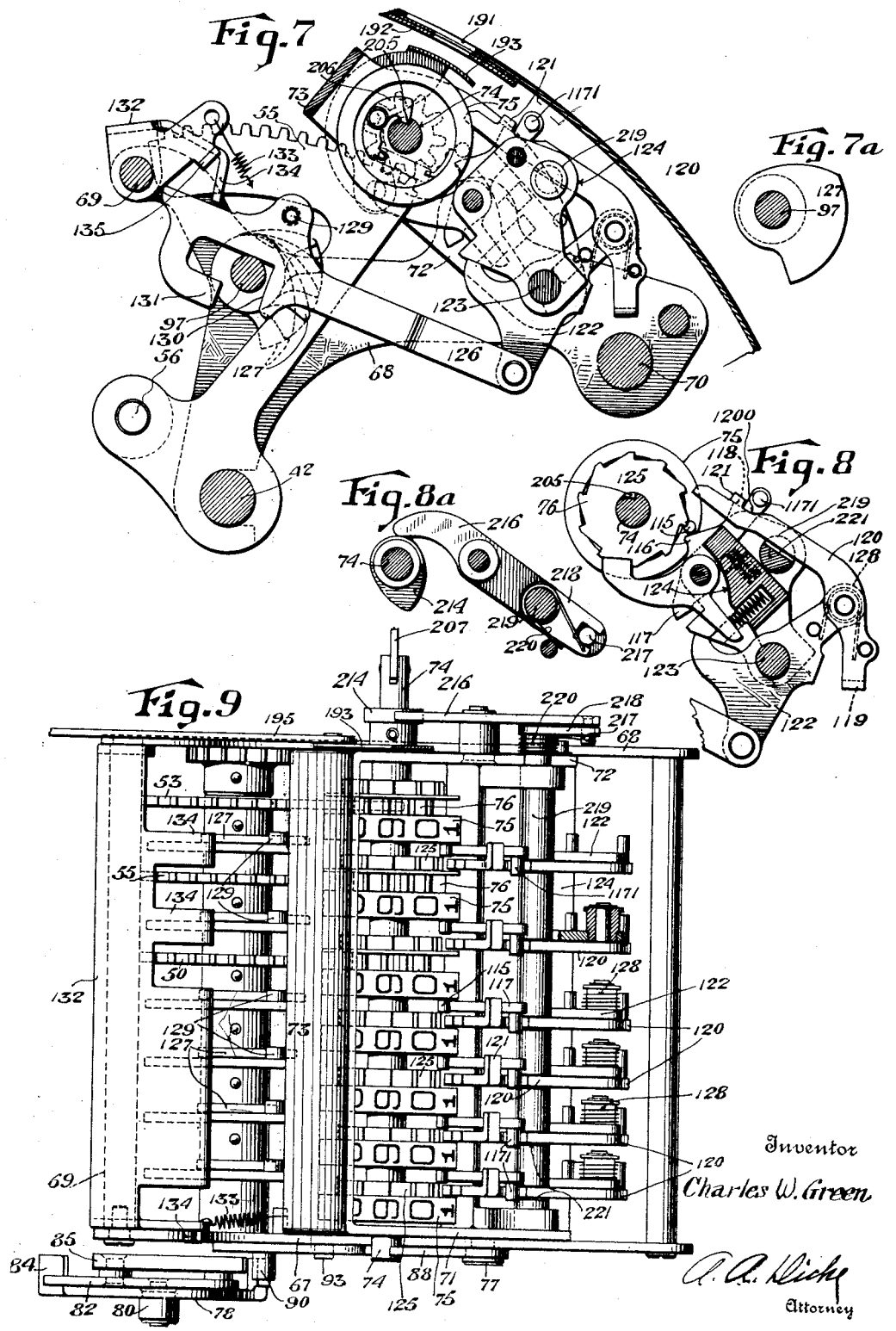

Aug. 30, 1932. C. W. GREEN 1,874,285
CASH REGISTER
Filed April 13, 1927 8 Sheets-Sheet 6
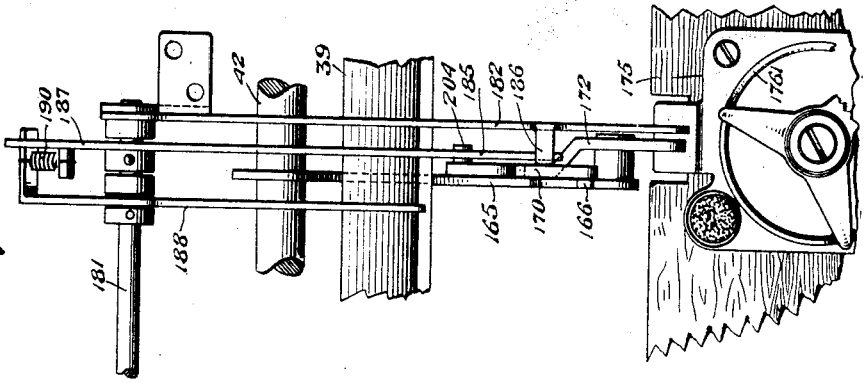
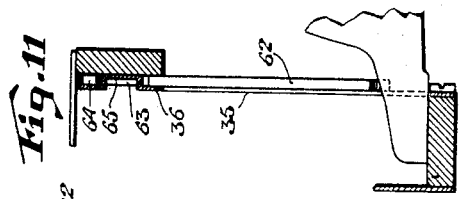
Inventor
Charles W. Green,
By A. A. Klick
Attorney

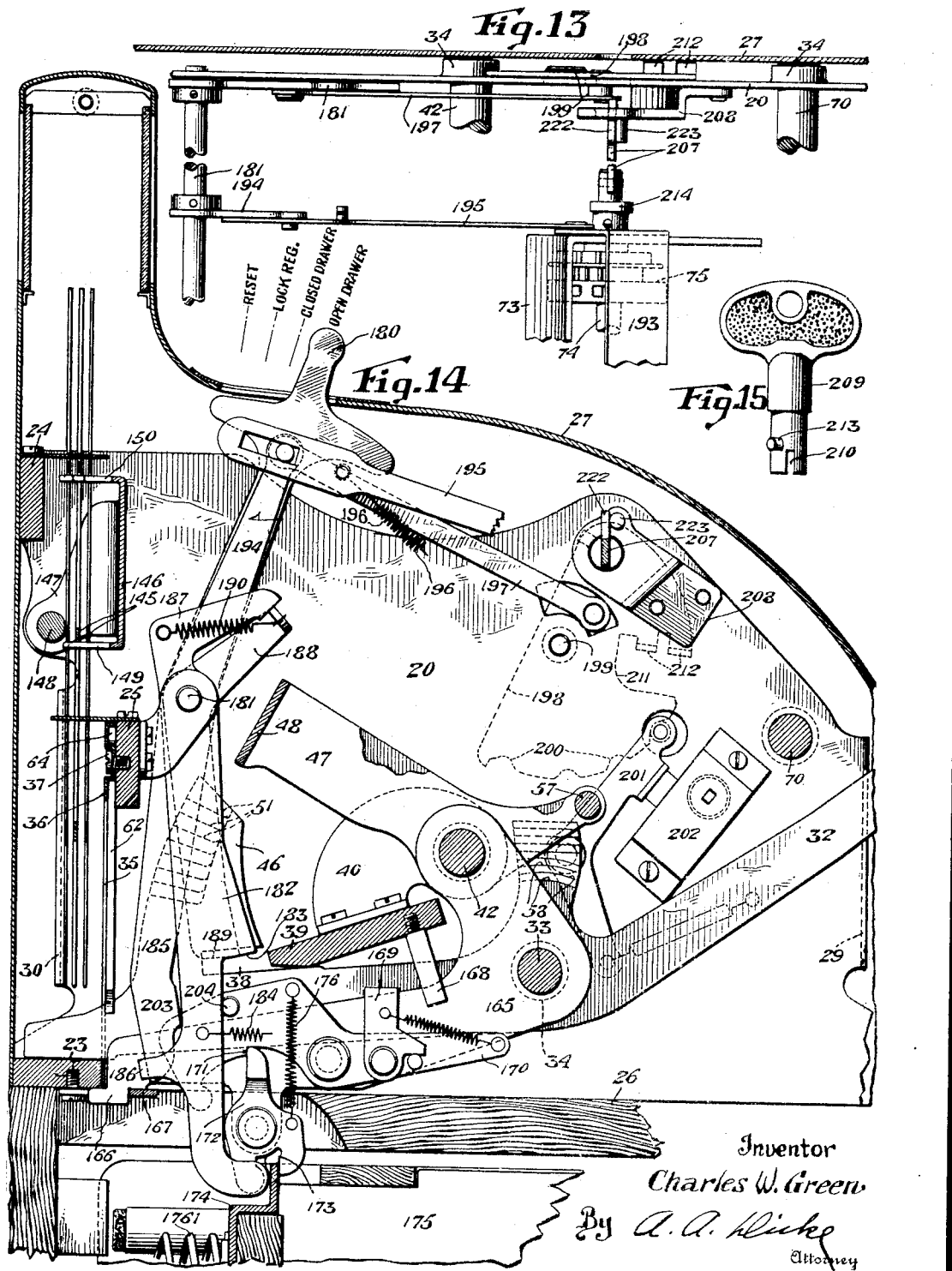

Aug. 30, 1932.  C. W. GREEN  1,874,285
CASH REGISTER
Filed April 13, 1927   8 Sheets-Sheet 8
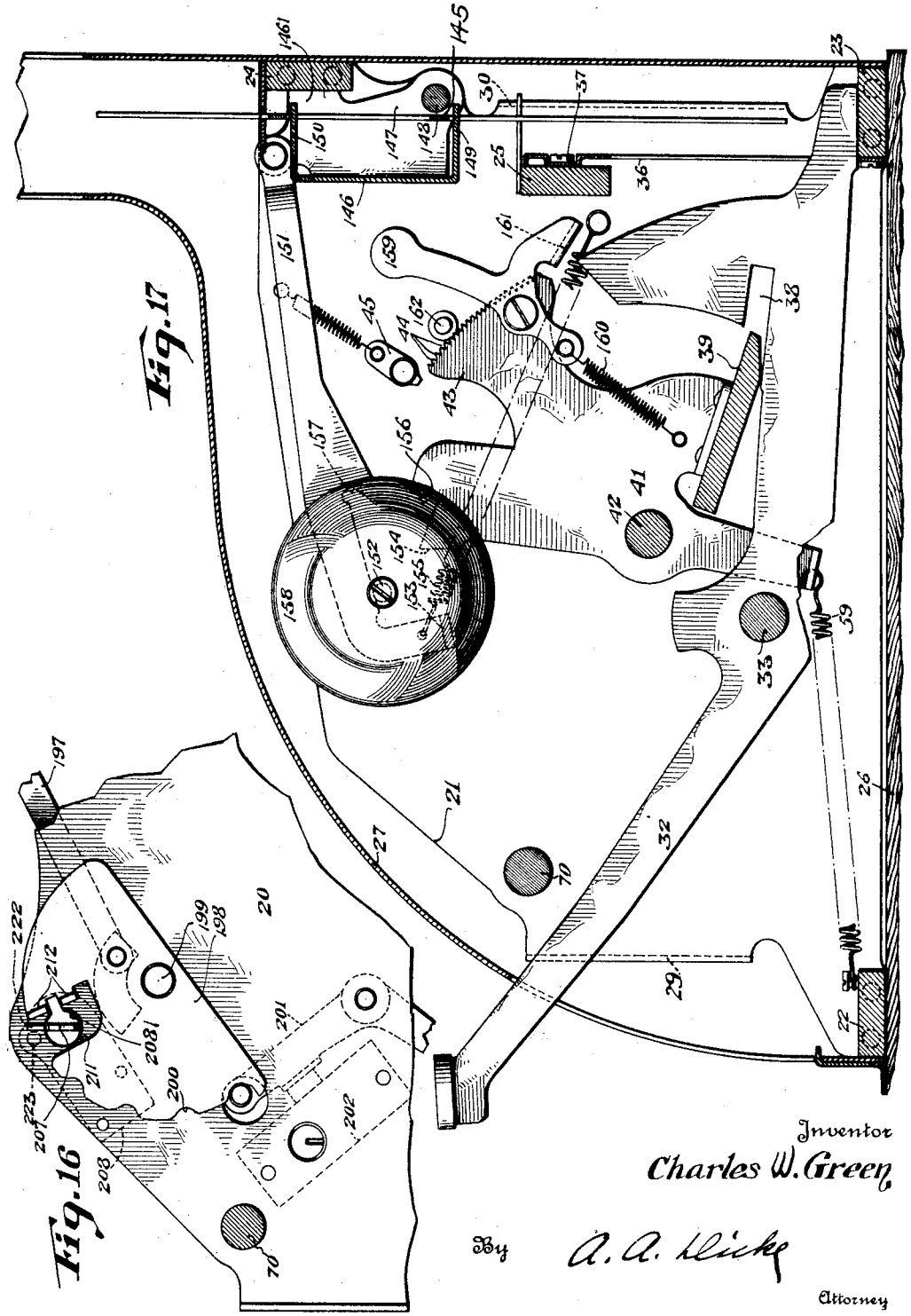
Inventor
Charles W. Green
By A. A. Dick
Attorney Patented Aug. 30, 1932

1,874,285

UNITED STATES PATENT OFFICE

CHARLES W. GREEN, OF ILION, NEW YORK, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed April 13, 1927. Serial No. 183,392.

This invention relates to accounting machines in general and particularly to improvements in cash registers and it consists largely in the peculiar construction, arrangement and combination of different parts whereby a very positive operation of the whole device is obtained in a very simple manner, the construction precluding any irregular operation or tampering with fraudulent intent which is usually the main cause of the parts getting out of order.

An object of the present invention is to construct a machine of the character described in such a manner that there are comparatively few parts and, therefore, the machine may be constructed at a low cost, but without sacrificing accuracy of operation or durability.

The machine shown is of the so-called key-operated type and it is an object of the invention to provide such a construction that nearly all of the operating parts may be punched from sheet metal, thus requiring very little machine-work and thereby tending toward a low cost of manufacture of parts and their assembly into a complete machine. While the present invention has been disclosed in connection with a machine of a particular type, it will be clear that many of the features to be described are, by reason of their simplicity and effectiveness, adaptable to machines of other types than the key-operated machine in connection with which they are shown.

In carrying out the foregoing objects the present invention provides an improved key coupler mechanism for the performance of functions well known to those skilled in the art. It is common in the class of machines to which the present improvements are applied to provide a driving mechanism usually consisting of a shaft driven or operable by the key coupler. In the illustrative machine the driven shaft has been done away with and the key coupler is made to act directly as the driving mechanism and by novel connections therewith, a number of the operating parts of the machine, such as the drawer release mechanism, indicator controlling devices, and totalizer engaging mechanism are controlled. By dispensing with the driving shaft and connections to the key coupler a number of parts are eliminated thereby tending to simplify the machine.

Another special object of the invention is to provide an improved differential mechanism which is simple in construction but effective in its performance and at the same time the construction is positive in its action so that it is impossible for the operator to improperly throw the differential mechanism by violent and forcible operation of the keys to register other than the items represented by the depressed keys.

Briefly, the above object is accomplished in the machine herein disclosed by mounting a frame for operation by the keys in such a way that by the co-operation of stepped projections formed on the rear ends of the keys the frame will be differentially actuated but when moved to the desired extent the opposite side of the frame will co-operate with a complementary projection formed toward the front end of the operated key thereby locking the frame at the end of the stroke to prevent overthrow. Thus a positive stop is provided for each differential frame and actuator when the latter reaches the position determined by the key depressed, and at the same time stops are thus provided for the totalizer pinions which have been engaged with the actuators during the rocking of the latter.

In respect to the totalizer and transfer mechanism therefor, it is also an object to provide an improved form of construction whereby the frame which carries the reading elements of the totalizer is normally out of engagement with the actuators and is positively held in such position. As is usual during an operation of the machine, it is necessary to lower the totalizer wheel supporting shaft in order to secure a proper engagement between the totalizer wheel pinions and their actuating segments and to automatically raise the shaft to disengage these parts at the end of an accumulating operation. The means contemplated by the present invention for this purpose is positive in its action and although operated solely by an oscillatable member is as effective as the ordinary box cam mounted on a rotary shaft.

The transfer mechanism is also of novel construction which is a substantial improvement over the prior art in many respects, particularly in the matter of permitting the transfer arms to be positively operated by an oscillating shaft rather than a shaft which is given a complete rotation during each operation of the machine.

Another object of the invention is to provide in the machine shown a totalizer and a totalizer resetting mechanism well adapted by simplicity of construction and easy operation to facilitate resetting operations when desired.

In connection with the various operable elements of the machine, such as the operating keys, the resetting devices and the drawer mechanism, it is an object to provide a simple and effective means to properly regulate their operation. For example, the system contemplated is so designed that in certain positions of a general controlling lever the operating keys may be so controlled that their operability will be either dependent upon or independent of the position of the cash drawer as desired, while in still another position of the lever the operating keys may be completely and effectively locked. In still another position of adjustment of the lever the operating keys are also locked but this position is primarily for the purpose of permitting resetting of the totalizer elements and reading of the latter through apertures formed in the machine cabinet. It is also a part of the invention to provide means whereby the totalizer elements may only be read when the control lever is in this definite position of adjustment.

In respect to the general control lever it is also an object to provide an improved form of aligning mechanism so co-ordinated with a lock that when the latter is operated the control lever is locked in whatever position it may have been adjusted to.

Still another object of the invention is to provide an improved mechanism for exposing the indicators and this feature of the invention relates primarily to the form of the indicators per se and their arrangement as well as to the peculiar construction of the means employed for holding up the operated tablets and releasing at each operation those that have been previously operated. Tablet indicators are employed in the illustrative machine since the inherent characteristics of indicators of this type provide many advantages over others. They present a plane surface to the eye and the extent of surface on each is great enough to permit the use of characters of such size that they may be read from a reasonable distance. One disadvantage of the usual form of tablet indicators, however, as applied to a machine of the general type illustrated arises from the fact that the keys are arranged transversely of the machine and that the ends of the keys must directly co-operate with the indicator stems. This has usually necessitated a corresponding arrangement of the indicators and keys whereby adjacent indicators of different groups overlap each other. The result has been an indication which is confusing since two adjacent numbers could not be clearly exposed but by changing the form of the indicators and grouping the indicators according to denominations the objection just mentioned may be overcome. While such grouping of the indicators eliminates many of the objectionable features of the prior art constructions in which the indicators are otherwise arranged the grouping of indicators in different denominations also brings up another objection. Since the indicators due to their thickness, cannot be arranged in substantially the same plane or within reasonable distance of the glass through which they are read, they are apt to conceal one another when viewed from any position except from directly in front of the machine, and thus have their utility greatly diminished. This problem in the machine shown has been solved by dividing the indicators of a particular denominational group further into separate smaller groups. The construction and arrangement which have been devised result in an indication which is very satisfactory both from the viewpoint of manufacture and commercial use.

The indicators are simple in construction and are formed without lugs or any other projections and co-operate with a wing plate which is peculiarly constructed and so arranged that it co-operates with the indicators to hold them in elevated position until it is desired to drop them and any attempt to force an indicator beyond the exposed position is also effectively prevented.

Yet another object extends to the improvement of the single key mechanism or the devices used to prevent the simultaneous operation of two or more keys in the same group. The pendants utilized are of substantially the usual form but by the peculiar construction of the supporting plate the pendants are fulcrumed without the necessity of providing the usual pivot studs. Ease of manufacture and assembly naturally result from this improved construction and arrangement.

Many other improvements are incorporated in the present machine among which may be mentioned the provision of a device for ringing a bell at each operation of the machine, which is extremely simple, practical and durable. The present improvements have also been extended to the drawer release mechanism which is a unit simple in construction, that by its improved design has overcome many of the defects of constructions heretofore employed.

With these and incidental objects in view the invention consists in certain novel features of construction and combination of parts, the essential elements of which are set forth in the appended claims, and a preferred form of embodiment of which will now be described with reference to the drawings which accompany and form part of the specification.

Of said drawings:

Fig. 2 is a sectional view of the machine taken substantially through its mid-portion. This view shows particularly the differential and totalizing devices and the means whereby they may be brought into and out of cooperative relationship.

Fig. 3 is a detail view in side elevation of the elements comprising the totalizing engaging mechanism.

Fig. 4 is a top plan view of the machine, the cabinet being cut away to show the arrangement of the mechanisms located within. This view shows substantially all the devices utilized for registering and indicating operations as controlled by the various operating keys.

Fig. 5 is a partial sectional view taken through the machine showing the differential mechanism, the totalizing device and a modification of the means for engaging the totalizer with the differential actuators.

Fig. 6 is a top plan view showing a portion of the transfer mechanism and illustrates how the totalizing device is mounted in the stationary support frame.

Fig. 7 is a cross sectional view of the totalizer showing the transfer mechanism.

Fig. 7a is a detail of the lowest order transfer operating cam.

Fig. 8 is a view in side elevation showing the position that the parts assume when a transfer is to be effected.

Fig. 8a is a detail of certain parts which serve to restore the transfer pawls during resetting.

Fig. 9 is a top plan view of the totalizer and its transfer mechanism.

Fig. 10 is a partial view of the back of the machine showing the form and arrangement of the indicators and the single key mechanism.

Fig. 11 is a sectional view taken on the line 11—11 of Fig. 10.

Fig. 12 is a front elevation of the drawer release mechanism and associated controlling devices.

Fig. 13 is a top plan view of a number of the elements associated with the controlling device for the machine.

Fig. 14 is a view in side elevation showing the control lever in the "Open drawer" position and its effect upon the key locking devices and drawer release mechanism. This view also shows a portion of the resetting devices.

Fig. 15 is a view of the key utilized to perform resetting operations.

Fig. 16 is a view in side elevation of a portion of the mechanism utilized to prevent or allow resetting operations. This view also shows the lock for locking the control lever in its adjusted position.

Fig. 17 is an end view of the machine showing particularly the full-stroke device, the bell sounding mechanism and the indicator release mechanism.

Figure 1:
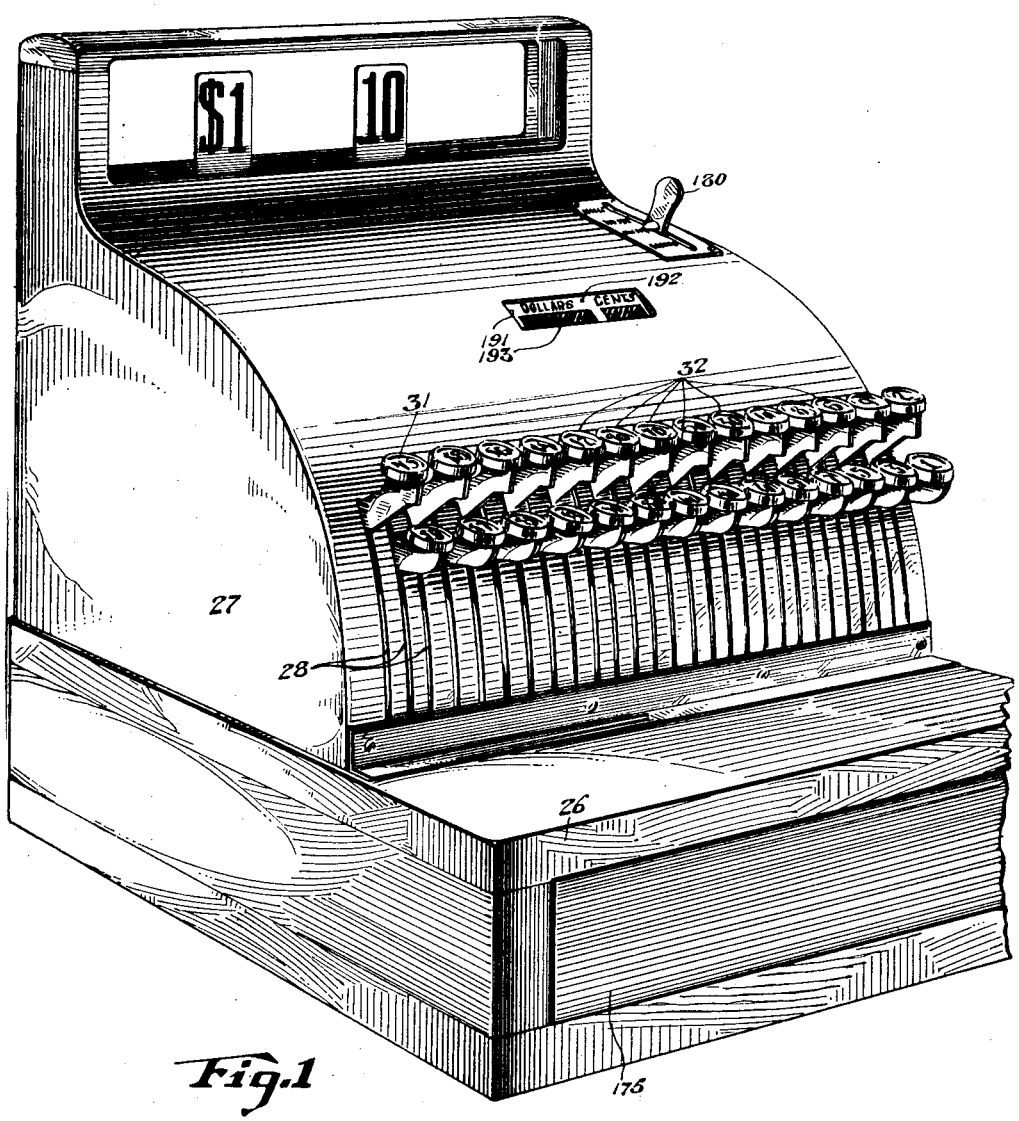
Fig. 1 is a perspective view of the machine to which the present invention is applied showing particularly the arrangement of the operating keys. This view also shows the adjustable lever for exercising control over the machine as well as the opening through which the totals may be read.

For convenience of description the principal elements of the machine will first be enumerated and their general purpose, arrangement and co-operation will be briefly explained in order to indicate the general operation of the machine as a whole, after which the preferred construction of these parts will be described more in detail together with the function, construction and operation of certain secondary or accessory mechanisms associated therewith.

Briefly stated, the invention has been disclosed in connection with a key-operated cash register having a plurality of banks of amount keys and a special key designated as the "No sale" key. All of the amount keys have connections to the indicator tablets and, furthermore, operate a differential mechanism so as to insert the items in the totalizer. As is usual in this class of machines, as the keys are operated they are connected to a key coupler which, in the present instance, is the sole driving means for the various common mechanisms operated by all of the keys.

In order to permit operation of the machine in different ways, such as, requiring the cash drawer to be returned before the keys may subsequently be operated, or permitting the machine to be successively operated irrespective of the position of the cash drawer, a single lever is provided for controlling the intended mode of operation. Movement of this lever to another position furthermore will totally lock the keys against manipulation.

At the termination of a day's business the same control lever may be brought to still another position designated as "Total and reset" in which the machine is conditioned for the reading of the total, as well as a resetting operation. In this position of the control lever the cash drawer is released but the keys are locked against operation.

Resetting in the present machine is accomplished by inserting a detachable key the rotation of which results in bringing the totalizer elements to their zero positions.

In order to temporarily hold the control lever in any of its differentially adjusted positions a suitable aligning or detent device is provided and when the bolt of a lock, the key of which is usually retained by the proprietor or any authorized person, is projected, the aligning device will be held against movement thus locking the control lever in its particular position of adjustment.

The total of the amounts may only be read when the control lever is brought to the "Total and reset" position, since in other positions of the control lever the totalizer elements are concealed by a shield or shutter.

The general organization and operation of the machine as a whole having been thus outlined the preferred construction of the various parts above referred to will now be described more in detail.

*Framework*

The various parts of the mechanism are supported by a suitable framework comprising two parallel side plates 20 and 21 (Fig. 4) these plates being spaced apart by and connected to cross members so as to provide a rigid framework structure. The forward and lower portions of the plates 20 and 21 are connected by a cross member 22 (Fig. 2) said plates being connected together at their rearward portions by cross members 23 and 24 (Fig. 2) and an intermediate cross member 25. The side plates are connected to the cross members just referred to by any suitable means such as screws passing through the side plates and into the cross members. The framework just described rests upon a drawer base 26 and may be attached thereto by screws passing through the cross members 22 and 23 and into the top of the drawer base. As best shown in Fig. 1, the mechanism is enclosed by a cabinet 27 which may be made of any desired material. The cabinet is slotted at 28 to receive and guide the key levers in their movements and is, furthermore, apertured at its upper end to permit the viewing of the elevated indicators through suitable diaphanous material at the front and rear. The cabinet which is preferably secured in some way to the frame work rests upon the drawer base and is spaced apart from the side plates 21 by pairs of bent lugs 29 and 30 (Figs. 4 and 14) which are formed as overturned portions of the side plates 20 and 21.

*Keys—key coupler and full-stroke device*

The illustrtive machine is provided with keys 32 divided into groups (Figs 1 and 4) one group for registering amounts from 1¢ to 9¢, another group for registering amounts ranging from 10¢ to 90¢ and a third groups for registering values of $1 to $9. Obviously, more amount keys could be provided if desired. A special key is also provided and is designated as the "No sale" key 31, the primary function of which is to release the cash drawer for the making of change.

As best shown in Fig. 2, the amount keys 32 and "No sale" key 31 are pivoted upon a shaft 33 supported by the side plates 20 and 21. In order to provide a suitable bearing for the shaft, since the side plates are of relatively thin material, these plates 20 and 21 are punched and drawn outwardly at the proper points so as to form portions 34 (Fig. 4) in the form of collars, the internal bore being substantially the diameter of the key supporting shaft 33. By the construction just described a suitable journal is provided for the shaft 33 at each end since the weight of the shaft and parts carried thereby is distributed over a relatively large bearing surface. It will be noted that when the cabinet is in place any lateral movement of the shaft 33 will be effectively prevented since the side portions of the cabinet will substantially contact with the ends of the shaft.

The amount keys 32 and "No sale" key 31 which carry at the front portions of the levers suitable key caps bearing indicia designating the nature of the keys, play in the slots 28 formed in the cabinet. At their rear ends the keys are guided by slots 35 (Figs. 2 and 10) formed in a plate 36 secured to the cross bar 25 by screws 37.

All the keys are provided with notches 38 (Fig. 2) adapted to receive the rearward end of a key coupler 39 which extends between the side plates 20 and 21 and which rests upon the rear ends of the keys. The key coupler is pivotally supported by means of plates 40 and 41 (Figs. 2, 4, 5 and 9) attached to the key coupler and which are suitably apertured to receive a shaft 42 which is located in substantially the mid-portion of the machine. The shaft 42 is supported by the side plates 20 and 21 in a manner similar to the shaft 33. It will be obvious that when the forward ends of the operating keys are depressed the key coupler 39 will be rocked clockwise so that its rearward end will enter the notches 38 of the depressed keys. The purpose of such key coupler mechanism is well known in the art and need not be discussed herein.

It is essential that some device be provided to insure a complete performance of the started registration before a second operation can subsequently be effected. To this end any suitable mechanism may be provided but in the present instance the plate 41 (Fig. 17) which supports one end of the key coupler is extended upwardly and to the rear to form a segment 43 provided with teeth 44 adapted to co-act with a pawl 45 to which a spring is connected. Very early in the operation of the machine the engaging end of the pawl will co-act with one of the teeth and thereby hold the key coupler and key in their operated positions even though pressure on the key may be released and during the subsequent portion of the downstroke of the key the ratcheting of the pawl over the teeth will prevent any retrograde movement of the key or key coupler. At the termination of the down-stroke of the key, the full-stroke pawl will be disengaged from the rack thus permitting the restoration of the keys and the key coupler but at the same time after the return movement has commenced movement in the opposite direction is prevented.

As will be noted in Fig. 2, the rear ends of the keys are formed with upstanding projections 46, the forward edges of which are substantially concentric with respect to the key coupler supporting shaft 42. When the key coupler is being operated the rearward end thereof will pass in front of the concentric portions of the unoperated keys thereby locking them against movement. Since this mechanism is well known in the art it need not be discussed herein in further detail.

*Differential mechanism*

The differential mechanisms or devices controlled by the various groups of keys for entering the desired amounts in the totalizer are all similar in construction and principle of operation and a description of one will suffice for all.

The differential device associated with the dollars bank of keys is shown in Fig. 2 wherein it will be noted that mounted upon the shaft 42 is a frame comprising parallel side members 47 (see also Fig. 4) integrally joined by a cross bar or bail 48 which normally stands over the projections 46 of the keys of the dollars bank. The frame just described is attached to the shaft 42 by a pin 49 (Fig. 4). Also attached to the shaft 42 at substantially its mid-portion is a segmental rack 50 adapted to operate the dollars element of the totalizing devices to be described hereinafter in detail.

As will be noted in Fig. 2, the rearward portions of the upstanding projections 46 of the keys of a group are suitably cut away so as to form steps 51 which are at different distances from the cross bar 48. The graduations are directly in the path of the cross bar 48, the consequence being that when the keys are depressed a lost motion is effected between the keys and the frame, but at a certain time the step 51 of the depressed key will coact with the frame to operate it and in this manner a differential movement is given to the frame depending upon the key depressed. All of the keys of the dollars bank have the same extent of movement and since in this manner the rack 50 will be operated differentially the associated totalizer element will be operated correspondingly.

The differential frame associated with the cents bank of keys is shown in Fig. 4 and denoted by reference character 52, this frame being loosely mounted upon the shaft 42 and one of the side members of the frame has attached thereto a cents operating rack 53. The nine keys associated with the cents bank are provided with differential graduations similar to those described in connection with the dollars bank of keys.

The frame member 54 associated with the dimes bank of keys is also shown in Fig. 4, and is loosely mounted upon the shaft 42 but is connected to the dimes operating rack 55 by a connecting stud 56. (Fig. 7.)

From the above, it will be evident that depression of keys in one or more groups of keys will adjust their corresponding racks to effect the proper registration. Attention is directed to the fact that the "No sale" key 31 is outside of the range of the dollars differential frame and will, therefore, have no effect on the differential devices when operated.

As best shown in Figs. 2 and 4, the parallel side members of the dollars frame are extended forward of the shaft 42 and are joined together by a cross rod 57 to provide an additional control whereby overthrow of the frame is prevented. It will be seen in Fig. 2 that directly over the key supporting shaft 33 the keys are provided with upstanding portions 58, the upper edges of which are at different heights so as to provide differential steps which are complementary with respect to the steps 51. From this construction it follows that as the key is depressed the projection 51 will co-operate with the cross bar 48 rocking the frame differentially until the rod 57 engages the upstanding portion 58 of the depressed key at which time the frame will be positively locked inasmuch as the graduations of the keys co-operate with opposite sides of the differential frame. This locking action takes place at substantially the termination of the down-stroke of the keys at which time the differentially operated racks will thus also be held in their adjusted positions. It will also be noted in Fig. 2, that the forward edges of the upstanding projections 58 are concentric with respect to the shaft 42 so that as the cross rod 57 co-acts with the step of the operated key there will be no interference between the cross rod 57 and the upstanding portions 58 of the unoperated keys of that bank.

A similar overthrow preventing means is provided for each bank of keys so that upon the depression of the keys of different banks the frames and associated racks will not be carried beyond the positions which they are intended to assume.

*Positive return of actuators and differential frames*

When a key is fully depressed and then returned to its normal position by means of the weight of the key coupler 39 as well as a spring 59 (Fig. 17) connected to the key coupler the differential frame and rack will be restored to normal position (shown in Fig. 2) by virtue of the balance of weight of the several parts of the frame. In order to positively restore the frame to its normal position, however, without depending upon the weight of the frame or springs which may be connected thereto if desired, there is loosely mounted upon the shaft 33 a restoring lever of bell-crank formation, one arm 60 of which normally coacts with the underside of the key coupler and the other arm 61 of which extends upwardly and has a forward edge of cam formation normally coacting with the cross rod 57. It will be obvious that when a key is depressed the key coupler will move away from the arm 60 to permit the desired differential adjustment of the frame. During the restoration of the key coupler it will engage the arm 60 and rock the bell-crank so that the camming edge of the arm 61 will coact with the cross rod 57 and positively restore the frame to its normal position. This mechanism is also duplicated for the different banks of keys, one of the bell-cranks being provided for each differential frame.

Key stops

While the concentric edges of the upstanding portions 46 of the various keys in conjunction with the key coupler are intended to lock all unoperated keys after the initial movement of the key coupler it is desirable to provide mechanism to prevent depression of more than one key in a bank during a single operation of the machine. For this purpose the same general type of single key mechanism normally employed is provided and as shown in Fig. 10 comprises a series of key stops 62 the wedge-shaped lower ends of which co-operate with the rear ends of the keys in the usual manner so that upon the depression of a key in a bank the end of the operated key will fill the only available gap between the key stops in that group and thus lock the remaining keys. The upper end of each of the key stops is formed with a reduced portion 63 and terminates in a head 64. As best shown in Fig. 11, the guide plate 36 is bent so as to form a channel bar section 65. The channel bar is provided with a series of rectangular slots 66 which are somewhat wider than the width of the reduced portions 63 of the key stops. The key stops are applied to the plate 36 in such a manner that the reduced portions fit within the rectangular slots 66 the head 64 of each of the key stops resting upon a ledge formed by the channel bar. After the key stops are in place the plate 36 is attached to the cross bar 25 by any suitable means, such as screws 37. The difference between the width of the slot 66 and the reduced portion 63 of the key stop 62 permits a slight oscillatory movement of the key stop so that the key stops function in exactly the same manner as if they were fulcrumed by means of a pin.

Totalizer engaging mechanism

The machine also includes a totalizing device whereby the items determined by the operated keys are registered so as to furnish a total of the amounts entered in the machine. The registering mechanism in the main is carried by a frame comprising side plates 67 and 68 (Figs. 2, 4 and 5) which are tied together at their rear ends by a cross rod 69 and bifurcated at their lower portions to engage the shaft 42. The frame is held in position by a shaft 70 journaled in the side frames 20 and 21 and passing through circular apertures formed in each of the side members 67 and 68.

The totalizing device comprises a frame having side members 71 and 72 (Figs. 4, 5 and 6) integrally connected by a cross member 73. The totalizer frame carries a shaft 74 upon which is loosely mounted a series of registering wheels 75 each having attached thereto a totalizer pinion 76. The totalizer frame is pivoted within the stationary frame by short pins 77 (Fig. 6) passing through the side members 67 and 68 and into the side members 71 and 72 of the totalizer frame. These are the pivots about which the totalizer frame is adapted to be rocked during the initial depression of the keys so that the totalizer pinions will be immediately rocked into engagement with the actuating racks, the latter being then differentially operated under control of the keys so that at the extreme end of the depression of the keys a corresponding amount will have been transferred into the totalizing device. Upon the return movement of the keys the totalizer pinions will be disengaged from the racks thus permitting the latter to return to their normal positions without affecting the entry made upon the totalizer. The mechanism for effecting the above-mentioned rocking of the totalizer frame will now be described.

Loosely mounted upon the shaft 42 and slotted so as to engage the key coupler 39 is a segment plate 78 (Figs. 2, 3 and 4) which extends vertically in a plane adjacent the side frame 67. The segment plate at its upper end is provided with bent-over lugs 79 and 80 and carries a supporting collar 81 (Fig. 3). Pivotally mounted by means of a pin fitting in the collar 81 is a plate 82 provided with stop shoulders 83 and 84 which are adapted to co-operate with the lug 79. A switching cam plate 85 is attached to the plate 82 by suitable means such as a pair of rivets. A spring 86 connected between the segment 78 and the plate 82 normally retains the parts in the position shown in the drawings. The shaft 74 mounted in the totalizer frame is adapted to be engaged by an open ended slot formed in a member 88 which is pivoted at 89 to the supporting frame member 67. The rearward end of the member 88 carries a pin 90 normally resting upon the lug 80 and the member 88 is also provided with a pair of stop shoulders 91 and 92 adapted to co-operate with a pin 93 carried by the frame member 67.

In the position shown in the drawings (Fig. 2) it will be noted that the totalizer frame is normally locked and any downward movement, accidental or intentional, will be prevented by the co-operation of the pin 90 with the lug 80 while upward movement is prevented by the shoulder 92 engaging the pin 93. During the operation of the machine the key coupler 39 will rock the plate 78 clockwise and the initial movement will permit the totalizer frame to be rocked by the member 88 so that the totalizer pinions 76 may engage their related rack segments since at this time the pin 90 will pass between an inclined portion 94 of the lug 80 and the adjacent edge of the switching cam plate 85. Continued rocking of the plate 78 will positively cam the totalizer frame by the action of cam plate 85 to carry the totalizer elements into their lower or engaged position this action being assisted by the weight of the totalizer frame. During the continued clockwise movement of the plate 78 (Fig. 2) the segments will be moved differentially in the manner hereinbefore described, and during this time the pin 90 will contact with the underside of the cam plate 85 to hold the totalizer frame positively locked against upward movement thus insuring engagement of the totalizer pinions with the racks throughout the down-stroke of the keys even though the keys should be operated quickly and violently. When the plate 78 has rocked far enough to carry the pivot point of the cam 85 past the pin 90 the cam will rock clockwise against the tension of the spring 86 without disturbing the position of the pin. At a certain point in the operation the pin 90 will be completely disengaged from the cam plate thus permitting the spring 86 to again rock the plate to its normal position. At substantially the same time the pin 90 will pass beneath the lug 79 to still prevent any movement of the pin and plate 88. This condition is obtained at the extreme end of the down-stroke of the keys at which time the totalizer is still positively locked in the position in which the pinions are engaged with the segment racks.

At the beginning of the return movement of the plate 78, which is contemporaneous with the return stroke of the keys, the rearward camming edge of the cam plate 85 will cam the pin 90 upwardly thus positively rocking the totalizer frame to disengage the pinions from the segment racks. During the remainder of the return movement of the segment 78 the pin 90 will ride over the upper edge of the cam 85 which will guide the pin over the lug 80 until the pin again occupies the position shown in the drawings. It will be understood that the totalizer frame is also locked against movement during the return stroke of the keys.

In rapid operations of the machine there may be danger that the spring 86 will not act quickly in rocking cam plate 85 to insure the proper return of the pin 90 along the upper edge of the cam plate upon the return movement of the plate 78. To prevent misoperations which would result if the pin 90 did not describe the proper path under these circumstances the shoulder 84 of the plate 82 which carries the cam 85 is bent outwardly to co-operate with the pin 90 as the plate 78 reaches its extreme forward limit of movement so that if the spring 86 does not rock the plate 85 the pin contacting with the lug of shoulder 84 will positively force it to the proper position. It should be noted that the pin 90 at this time is held down by the lug 79 and can, therefore, have a very positive action on the sloping overturned portion 84. The subsequent riding of the pin 90 over the rear beveled portion of cam plate 85 will thus always be insured. While this device is simple it is an effective and adequate remedy for misoperations which might occur without it.

It will be observed in Fig. 2 that the slot in the member 88 which coacts with the end of shaft 74 is opened at one end. This permits the ready detachment of the totalizer from the associated totalizer supporting frame since to accomplish this it is only necessary to withdraw the supporting journal pins 77 and the removal of the totalizer frame may be effected without disturbing the position of the totalizer engaging devices.

Another type of totalizer engaging mechanism which is also satisfactory in operation and which may be substituted if desired for the form above described, is shown in Figs. 5 and 6. Referring to Fig. 5, it will be noted that loosely mounted upon the shaft 42 is a segment rack 95 which is slotted at 951 to engage a portion of the key coupler and by means of this connection the segment receives the same oscillating movement as the key coupler. The rack 95 drives a gear 96 which is attached to a shaft 97 journaled in the intermediate frames 67 and 68. The shaft 97 has secured at one end an arm 98 which is provided with a spring-pressed wipe pawl 99. Also loosely mounted upon the shaft 42 is a totalizer engaging cam plate 100 carrying studs 101 and 102 adapted to be alternately engaged by the shoulders of the wipe pawl 99. The plate 100 is provided at its upper portion with a cam slot 103 adapted to co-operate with a pin 104 carried by one of the side arms 71 of the totalizer frame.

It will be seen that the above described construction will provide for the movement of the totalizer into and out of mesh with the racks for adding purpose. Normally, the wipe pawl 99 stands just forward of the pin 101 so that as the segment 95 is rocked by the key coupler and the shaft 97 is rotated through a considerable angle the arm 98 and the shoulder of the wipe pawl engaging the stud 101 will rock the cam plate 100 counter-clockwise thereby causing the engagement of the totalizer pinions with the racks through the action of cam slot 103 on pin 104. It will be clear that the action of the wipe pawl on the pin 101 to rock plate 100 takes place at the commencement of the operation of the coupler so that the totalizer will be promptly moved into engagement with the actuators. Now toward the end of the downward stroke of the keys the wipe pawl will pass idly over the stud 102 to occupy a position above said stud similar to its normal position over stud 101 so that when the arm 98 starts on its rearward swing the shoulder of the wipe pawl 99 engaging the stud 102 will force the latter downwardly thus promptly rocking the cam plate 100 in a direction opposite to that in which it was first rocked and thereby disengaging the totalizer pinions from their actuating racks.

It is desirable to provide mechanism whereby the totalizer engaging plate 100 is locked in its normal and shifted positions during the proper periods. Loosely mounted upon a stud 105 carried by the totalizer support frame 67 and urged downwardly by a spring 106 there is provided for this purpose a rearwardly extending arm 107 having a lug 108 normally occupying a position in rear of an extension 109 of the cam plate 100. Pivotally mounted upon the rearward end of the arm 107 are spring-urged pawls 110 and 111 adapted to be alternately engaged by an extension 112 of the arm 98. A spring 113 extending between arms of the pawls urges them so that a shoulder on an arm of each of them contacts a lug 114 carried by the arm 107. During the initial movement of the keys and coupler the extension 112 co-operating with the pawl 111 will rock the arm 107 upwardly and carry the lug 108 out of engagement with the extension 109 thus permitting the wipe pawl 99 to rock the cam plate 100. After this action has taken place and by virtue of the subsequent disengagement of the extension 112 from the tail of the pawl 111 the arm 107 will be forced downwardly by means of the spring 106 so that the lug 108 will occupy a position forward of the extension 109 thus locking the cam plate 100 in its shifted position. During the return stroke of the keys the reverse operation will be effected since at this time the extension 112 will engage the tail of the pawl 110 which it passed and rocked idly on its pivot on the forward stroke, and will again elevate the arm 107 to permit a subsequent rocking of the totalizer engaging plate 100 to its normal position. Arm 107 will then drop again to hold the plate in its normal position. During the return of the keys to the normal position the extension 112 will rock past the tail of the pawl 111 at which time the parts will again be in the position shown in Fig. 5.

It will be observed in Fig. 5 that there is an independent movement of the keys with respect to the differential frame at the initial operation of the keys and this lost-motion is greatest for the lowest value keys of the group and the least for the highest value keys but even in the case of the "9" key (which has the highest step 51) the lost-motion affords sufficient time to permit engagement of the totalizer pinions with the racks before the latter are actuated. As previously stated overthrow of each differential frame is prevented by the co-operation of the cross rod 57 with the step 58 of the depressed key and since this co-operation occurs at the extreme end of the stroke of the keys the upper edges of the steps 58 may for some of the keys, be formed as straight lines, although, as will be explained, for other keys it is preferable to slightly curve these edges. The position of the step 58 associated with the "9" key and the position of the cross rod 57 when the key is fully depressed is shown in dotted outline in Fig. 5. It will be remembered that the totalizer pinions are temporarily held in engagement with the actuating racks or partially so at the very beginning of the return stroke of the keys for a period long enough to effect complete disengagement and during this period the pinions will serve to hold the segment racks stationary. It has been found in practice that rocking of the higher order keys about the pivot shaft 33 at the beginning of the return stroke would be prevented and the parts would become locked if the step 58 were in the form of a straight edge since the forward portion of the step of the key would tend to cam the rod 57 which is at this time locked by the action just described. For this reason the steps 58 for the higher order keys such as 6, 7, 8 and 9 are formed with their edges concentric with respect to the shaft 33. It will be noted, however, that the arrangement is such that this is not required for the lower order keys, whose steps 58 are further removed from the pivot 33.

*Transfer mechanism*

The transfer mechanism employed for the wheels above the units order is of the type in which the several orders are independently and successively actuated and it is operated upon the return stroke of the keys at which time the totalizer pinions are out of mesh with their respective actuators.

Each totalizer wheel carries a transfer pin 115 (Fig. 8) which is in the plane of an extension 116 of a spring-urged transfer trip pawl 117 provided with a stepped shoulder 118 (Fig. 8). The transfer pawls 120 are urged counter-clockwise (Fig. 8) by coil springs 128 so that normally a lug 121 formed thereon rests upon the shoulder 118. Each transfer pawl is pivotally mounted upon a related arm 122 all of which are journaled on a shaft 123 carried by a pair of ears formed on a supporting bar 124 securely fixed between the side frames 71 and 72 of the totalizer. When a totalizer wheel of a higher order makes a complete revolution the pin 115 will urge the transfer strip pawl forwardly thereby disengaging the lug 121 from the shoulder 118 and permitting the spring 128 to urge the pawl downward until the bottom edge of the transfer pawl rests upon the supporting bar 124. At this time the engaging end of the transfer pawl will be brought into operative engagement with a tooth of a ratchet wheel 125 (Fig. 8) attached to the pinion of the next higher order wheel so that when the transfer pawl is moved rearwardly co-operation of the pawl with the ratchet wheel will advance this wheel to effect the necessary transfer. In so doing the transfer pawl will also be raised due to the camming action of the next ratchet tooth so that the lug 121 will again rest upon the shoulder 118.

When a pawl 117 is tripped or forced forward by a transfer pin 115 as above described, the transfer pawl 120 will be released and will be drawn downward by the coil springs 128, but if they should move downward too slowly or by any means become stuck in their elevated positions they are positively forced downward by pins 1171 (Fig. 8) carried by the trip pawls and adapted to engage the upper edge of the transfer pawls.

The tail of the pawl 120 is bent to form a lug 119 which is adapted to co-operate with the forward edge of the arm 122, and is provided for the purpose of preventing said pawl from being out of engagement with the ratchet teeth at the end of the extreme rearward travel of said pawl with the result that overthrow due to a too rapid transfer operation is prevented.

The upper edge of the transfer pawl 120 is preferably notched as at 1200 (Figs. 7 and 8) so that at the extreme end of the transfer operation the pin 1171 will overlie the notch 1200, the upper end of the pawl 117 having followed the pawl 120 rearward in the operation of the latter. This permits lug 119 to contact the forward edge of the arm 122 and act as an overthrow preventer. If so desired, the notch 1200 and lug 119 may be dispensed with so that pin 1171 co-acting with the upper straight edge of the pawl 120 will prevent overthrow. In some instances it may be desired to use both the pin 1171 and lug 119 to prevent overthrow.

The means whereby the transfer pawls are successively actuated so as to effect the necessary transfers comprises, as shown in Fig. 7, a series of links 126 each connected to a related arm 122 and slotted so as to engage and rest upon the oscillating transfer shaft 97. Upon the shaft 97 are secured a plurality of transfer cams 127 which are spirally arranged as to actuate the links 126 of the different denominational orders seriatim. Each cam 127 is in the plane of a pin 129 carried by its associated link 126. It will be obvious that during the downward stroke of the keys the transfer shaft 97 will first be rocked counter-clockwise as previously described, and by the co-operation of the cams 127 with the pins 129 the several links will be successively elevated thus rocking of the links 126 being guided by the co-operation of concentric edges 130 of the links with the shaft 97 until the cams clear the pins whereupon the links will drop to their normal positions. During the return stroke of the keys the cams 127 will engage the opposite sides of the pins 129 thereby forcing the links forwardly, the latter being guided in their movements by the slotted portions above fingers 131 engaging the shaft 97. In this manner each of the transfer pawls will be actuated and those that have been tripped will effect transfers. When the cam 127 clears the pin 129 the coil spring 128 connected between the arm 122 and its associated transfer pawl will return the parts to normal (Fig. 7). It will be noted that as the cam 127 moves the link 126 forwardly to force the transfer pawl rearwardly the ends of the spring will be brought together thus storing up additional energy in the coil spring 128 and this energy is released when the cam 127 leaves the pin 129. Since the link 126 by moving the arm 122 stores up energy in spring 128 this energy will be dissipated to return pawl 120, arm 122 and link 126 when the latter is released from the cam 127. When the link 126 is released the energy in the spring 128 will tend to rock the pawl 120 counter-clockwise, but since the pawl already contacts a stationary member the energy will be used to rock arm 122 clockwise thus forcing arm 126 rearwardly and pawl 120 forwardly.

It will be observed from what has just been stated that the upward movement of the links 126 is produced by the cam 127 during the downward movement of the keys, and that after each cam 127 is entirely disengaged from the related pin 129 the weight of the link is depended upon to restore it to its lower position where it rests upon the shaft 97 so that shortly after this, the reverse movement of the cam 127 will force the link forwardly to effect a transfer. In rapid operations of the machine the weight of the member 126 may not be sufficient to restore it to its normal position prior to the return movement of the cam 127 so that if the links 126 should be held by frictional forces the finger portion of the link indicated by the reference character 131 (Fig. 7) would engage the rear portion of the transfer shaft 97 and thereby prevent further operation of the keys. In order to prevent such misoperations a tensioning device which is common to the links 126 is provided and as shown in Figs. 7 and 9 comprises a member 132 which is loosely pivoted upon the tie rod 69 and is urged clockwise by a spring 133 so that bent extensions 134 thereof co-operate with the upper rearward edges of all the links 126. As will be observed in Fig. 9 a plurality of these extensions are provided to co-operate with all of the links but normally the extensions are slightly above the links and are held in this position by means of a lug 135 integral with the member 132 contacting a portion of said frame 67.

It will also be observed in Fig. 7a that the cam 127 associated with the transfer elements between the units and dimes denominational orders is of different contour than the other cams in that a considerable portion of its outer periphery is concentric with respect to the shaft 97 so that at the beginning of the operation of the shaft the high concentric portion of this cam will almost immediately co-act with the pin 129 of the related link 126 and will raise the latter and hold it elevated for a considerable period. Since one of the extensions 134 coacts with the upper side of this link it will rock the member 132 upwardly against the tension in the spring 135 and will retain it in this position until the operated key reaches close to the end of its downward stroke. This construction prevents a "ratcheting" effect which would otherwise occur as the pins 129 of the several links 126 successively drop from the high portions of their related cams 127. When the pin 129 leaves the outer concentric part of the cam 127 of the lowest denominational order, the member 132 is released, so that the spring 133 will urge it downwardly and if one of the links 126 should be held elevated due to friction the related extension 134 will urge it downwardly to its normal position. This insures the restoration of the links to their normal positions prior to their forward movements and it will be apparent that by this means the danger of the portions 131 co-acting with the shaft 97 will be minimized if not altogether obviated.

The spring 133 is tensioned only during the down stroke of the keys when the most power is available. Since the projections 134 are a slight distance above the links 126 during the return stroke of the keys the spring 133 will have no action on the arms 126 and will, therefore, not place any additional load on the machine at a time when the available power is least.

It will be observed that a transfer pawl and related devices are provided for all of the wheels of denominational orders higher than the units and the several orders from lower to higher are operated successively so that at the end of an operation of the machine the transfer pawls will all have been operated and by thus completing the necessary transfers the totalizing wheels will indicate the true total sum registered.

Indicating mechanism

The machine also includes an indicating mechanism whereby the items as represented by the various keys depressed are publicly indicated during each operation of the machine. The indicators in the present instance comprise flat tablets bearing suitable indicia, the tablets being provided with stems which co-operate with the operating keys. As best shown in Figs. 4 and 10, the indicators are arranged in groups of three so that for a full bank of nine keys there will be three adjacent groups of indicators. By this construction it will be obvious that all of the indicators are more nearly in the same plane than it would be possible to place them if each group contained the nine tablets related to a particular denomination. Thus, in the event of the depression of adjacent keys of different denominational orders one indicator will not hide the other to the same extent as if they were otherwise arranged.

The upper portions of the indicators as will be seen in Fig. 10 carry the designating characters and the character bearing portions are integral with indicator stems 140. The indicators are confined and guided in their reciprocatory movements by having the stems fitted into slots formed in supporting plates 141 and 142 which are attached to the cross bars 24 and 25 respectively. It will be noted in Fig. 10 that of the indicators of a group of three the foremost indicator has its stem to the left of a central vertical line and that the stem is in the path of the rear end of its related key. Furthermore, the rearmost indicators of the several groups have their stems to the right of the vertical center line, these stems also being in the planes of their related keys. The intermediate indicator of each group, however, is different in shape from the others, and has its indicator stem centrally located so that it is directly in line with the rear end of its operating key. By this construction and arrangement it will be obvious that each indicator may be directly elevated by its associated key.

The stem of each indicator is provided with rectangular slots 143 and 144 (Fig. 10) which are separated by an integral portion 145. As will be observed from Figs. 2, 4 and 10 extending between the side members 20 and 21 is an indicator retaining bar or bail 146 located forwardly of the indicators and pivoted by integral side arms 147 which are apertured to receive a shaft 148 extending transversely of the machine and journaled in the side frames 20 and 21. The bar 146 is of a channel formation and the lower horizontal portion is formed with a plurality of projecting fingers 149 substantially equal in length (Figs. 2 and 10) and each of which projects through the lower rectangular slot 144 of one of the indicator stems. The co-operation of the lower ends of the slots 144 with the fingers 149 serves to stop the upward movement of the indicators when raised by their keys and especially to prevent any overthrow movement of an indicator when the associated key is operated violently and quickly.

The upper portion of the channel bar 146 is also provided with projecting fingers 150 which as shown in Fig. 4 are of different lengths. Normally each finger projects into the upper slot 143 of an associated indicator. However, when an indicator is elevated the related finger will co-operate with the slot 144 and will hold the indicator in raised position by means of cross piece 145 the construction being such that a definite rocking movement of the bar 146 will serve to disengage all of the fingers 150 from co-operation with the slots of the related indicators. This permits all of the indicators to be released at substantially the same time during the cycle of operation of the indicator releasing mechanism. As best shown in Fig. 17 one of the side members of the bar 146 is connected to a slidable member 151 the forward end of which is guided by a slotted stud 152 (see also Fig. 4) carried by the side frame 21, the extreme forward end of the slidable member 151 being provided with a lug 153 which is in the plane of an extension 154 of the key coupler supporting element 41. A spring 155 (Fig. 17) connected between the member 151 and a stud carried by the side frame 21 urges the bar 146 rearwardly to the position shown in Fig. 17 until stopped by an extension 1461 integral with one of the side arms 147 co-acting with the bar 24.

The operation of the above described mechanism is as follows, it being assumed that an indicator has previously been elevated as shown in Fig. 2, at which time it will be noted that the integral portion 145 of the indicator stem rests upon its associated finger 150 so that the indicator is held elevated where it may be observed through the opening at the top of the cabinet. During the downward stroke of the keys the extension 154 of the coupler supporting plate will co-operate with the lug 153 thereby forcing the member 151 forwardly against the tension of the spring 155 rocking the bar 146 so that at a certain point in the operation of the machine the finger 150 will be disengaged from the portion 145 of the exposed indicator and since it is assumed that another key in the bank has been depressed the previously elevated indicator will drop to its normal position at which time the portion 145 will rest upon its related finger 149 to retain the lower end of the indicator stem slightly above the associated key as will be seen in Fig. 2. During the downward stroke of the depressed key the rear end thereof will co-operate with the stem of its related indicator raising it so that as the finger 150 is being drawn out of the path of the portion 145 of the previously raised indicator the portion 145 of the new indicator will be permitted to pass above the related finger 150 after which time the extension 154 will clear the lug 153 and permit the tension in the spring 155 to force the member 151 quickly rearwardly thereby rocking the retaining bar 146 so that the finger 150 projects into the lower slot 144 of the newly raised indicator (Fig. 10) at a point beneath the portion 145 and thus holding the indicator elevated.

When the extension 154 passes by the lug 153 permitting the spring 155 to draw the slidable member 151 rearwardly, rearward movement of the member 151 is limited by the co-operation of the lug 153 with a shoulder 156 formed on the plate 41. This occurs just prior to the extreme downward stroke of the keys so that continued movement of the key will move member 151 slightly forwardly and as the key returns the bar 151 will move rearwardly until extension 1461 strikes bar 24 after which the shoulder 156 will leave the lug 153. This retains the bar 146 in its outward position for a slightly longer time than it would be otherwise thus affording more time for the elevated indicators to drop to normal.

During the return movement of the keys the substantially horizontal edge of the extension 154 will cooperate with the lug 153 thereby rocking the slidable member 151 about its pivotal point without effecting any movement of the bar 146 and permitting the indicator to be retained in its normal position. In rapid operations of the machine forward movement of the member 151 is limited by the contact of a shoulder 157 with the reduced portion of the stud 152.

Audible signal

In order to audibly indicate that the machine is being operated there is provided a novel form of bell ringing device which in the machine shown, comprises a bell 158 which is carried by the stud 152. The bell 158 (Figs. 4 and 17) is in the plane of a bell hammer 159 which is pivoted to the coupler side plate 41 and has attached thereto a spring 160. The bell hammer 159 is provided with a lug 161 in the plane of a pin 162 fixed to the side plate 21. It will be noted that when the machine is operated the plate 41 will rock counter-clockwise (Fig. 17) so that the pin 162 co-operating with the surface of the lug 161 will rock the bell hammer 159 clockwise against the tension in the spring 160. At a certain point in the operation of the machine the lug 161 will be carried beyond and disengaged from the pin 162 permitting the spring 160 to rock the bell hammer 159 so that the hammer portion will strike the bell 158. During the return movement of the keys the pin 162 will co-act with the underside of the lug 161 and after the latter is carried past the pin the parts will be brought to the normal position, it being obvious that the bell hammer will not strike the bell during this operation.

Drawer release by an operation of the machine

In machines of the type shown, it is customary to provide a cash drawer which is released upon each operation of the machine and ejected under the action of a spring to expose the same for the purpose of making change or receiving the money tendered. The drawer release mechanism in the illustrative machine is primarily carried by a plate 165 (Figs. 12 and 14) secured in position at its forward end by means of the shafts 33 and 42, the rearward end of the plate being provided with an extension 166 which is located beneath the cross bar 23. The plate 165 is securely held at its rearward end and prevented from lateral movement by means of a slotted plate 167 through which the extension 166 passes, the plate 167 being attached to the plate 23 by suitable means such as screws. The key coupler is provided with a trip pin 168 which is in the plane of a spring-pressed pawl 169 pivoted to a drawer catch release lever 170 which in turn is pivoted on a stud carried by the plate 165. The drawer catch release lever 170 is also provided with a shoulder 171 engaging the upper portion of a drawer catch 172, the latter being provided with a hook portion 173 engaging a portion of a plate 174 carried by the cash drawer 175. A spring 176 connects the drawer catch release lever with the drawer catch. The cash drawer is normally urged outwardly by a spring 1761 carried by the drawer plate 174.

The result of the above construction is that when the key coupler is elevated the trip pin 168 will pass by the pawl 169 without effecting any movement of the drawer release lever 170 or drawer catch 172. During the return movement of the operating keys, which is concomitant with the downward movement of the key coupler, the trip pin 168 will engage the opposite side of the pawl and since the latter contacts with a stud carried by the drawer catch release lever 170 it will rock the latter clockwise against the tension of the spring 176 thereby disengaging the shoulder 171 from the drawer catch. This will result in releasing the hook 173 from the plate 174 and permitting the spring 1761 to be effective to force the cash drawer outward.

Machine control

In the type of machine shown in the drawings it is a common expedient to provide means whereby the keys are locked against operation while the cash drawer is exposed and thus the operator is forced to close the cash drawer at the end of each operation so as not to leave the money contained therein exposed between operations of the machine. The purpose of such constructions is also to compel the operator of the machine to make some record or indication before access to the money contained in the drawer may be had. In certain uses of machines it is desirable to disable the mechanism just described so as to permit successive operations of the machine during rush hours without closing the cash drawer after each operation. Again it is desirable at times to lock the operating keys irrespective of the position of the cash drawer so as to prevent tampering by unauthorized persons.

To provide for these functions the mechanism embodied in the illustrative machine is placed under the control of a single lever which may be operated from the exterior of the machine, but which may be locked so that movement of the lever cannot be performed except by persons having the key of the lock. The control lever is adapted to be shifted to any one of three positions to accomplish a corresponding one of the functions above mentioned.

Open drawer position of control lever

As is best shown in Figs. 1 and 14 the control lever 180 projects through a slot in the machine cabinet the latter being provided with an index plate which carries legends designating the positions of adjustment of the control lever. The control lever 180 is securely attached to a shaft 181 (Figs. 4, 13 and 14) which shaft is supported at one end by a bracket attached to the cross bar 25 and at the other end by the side frame 20. Loosely pivoted upon the shaft 181 is a locking arm 182 (Figs. 12 and 14) which is provided with a locking shoulder 183 adapted to co-operate with the rearward end of the coupler 39 and extends further downwardly so as to contact with the drawer plate 174. Attached to the locking lever 182 is a spring 184 which tends to rock it counter-clockwise (Fig. 14). Secured to the shaft 181 is a downwardly extending arm 185 which in the "Open drawer" position contacts with a lug 186 integral with the locking arm 182. In the position shown in the drawings, it will be observed that when the cash drawer is released the spring 184 will tend to rock the locking arm 182 forwardly so that its locking shoulder 183 will pass over the key coupler upon its return and lock the same as long as the cash drawer is open. This operation, in the position of the control lever shown, is prevented since it will be observed that forward movement of the locking arm 182 will be prevented by the co-operation of the lug 186 with the arm 185.

Closed drawer position of control lever

However, when the control lever is moved to the "Closed drawer" position it will rock the shaft 181 and carry the arm 185 slightly forward thus permitting the spring 184 to move the locking arm 182 so that the shoulder 183 thereof will pass over the key coupler and lock the same against movement as long as the cash drawer is open. When the cash drawer is forced inwardly the drawer plate 174 will contact with the lower end of the arm 182 to unlock the key coupler and tension the spring 184.

Lock register position of control lever

At times it is desirable to lock the keys and the cash drawer so as to prevent unauthorized persons from having access to the contents of the cash drawer by operating the keys. The present machine provides for this and as it will be noted in Fig. 14 the arm 185 extends upwardly to form an extension 187. Loosely mounted upon the shaft 181 is a supplemental bell-crank locking lever 188 provided with a locking shoulder 189. A spring 190 (Figs. 12 and 14) is connected between the extension 187 and the upper arm of the bell-crank lever 188. It will be obvious that in the "Open" and "Closed drawer" position of the control lever the lower portion of the locking arm of the bell-crank lever 188 will not be moved sufficiently to cause its shoulder to pass over the flange of the key coupler. When the control ever 180 is moved to the "Lock register" position, however, the shaft 181 will be rocked sufficiently so that it will, through the connected spring 190 move the locking bell-crank lever to bring its locking shoulder 189 over the key coupler 39 thereby securely locking the keys and preventing release of the cash drawer by operating the keys if the cash drawer should at this time be in its normal position.

It will be noted that when the control lever 180 is moved to the "Lock register" position, and when the cash drawer is in its outward position, the shoulder 183 of the locking lever 182 will also pass over the flange of the key coupler, but this locking action will be disabled when the cash drawer is returned. However, return movement of the cash drawer will not affect the position of the locking bell-crank 188 so that the key coupler will still be locked by this member.

Total and reset position of control lever

At the termination of the day's business or any other selected period it is desirable to obtain the total of the sales registered so that the receipts may readily be checked and after the total has been obtained resetting of the totalizer may follow. During this procedure it is desirable to obtain access to the contents of the cash drawer and to provide for all of the above functions the necessary control over the machine is effected by the control lever 180 when moved to the rearmost "Total and reset" position.

It will be observed in Figs. 4 and 9 that the totalizer elements bear characters which may be viewed through an aperture 191 (Figs 1 and 7) formed in the cabinet and also an aperture formed in a denomination designating plate 192. When the control lever is out of the "Total and reset" position reading of the totalizer elements is prevented by means of a shutter 193 which is pivoted to the side plates 71 and 72 of the totalizer frame. Attached to the shaft 181 is an upstanding arm 194 (Figs. 13 and 14) provided with a pin engaging a closed slot formed in a link 195 connected to one arm of the shutter 193. The slot formed in the link 195 is of sufficient length so that movement of the control lever to any of the three foremost positions will not operate the link 195 to move the shutter but when the lever is moved to the "Total and reset" position the link will be drawn rearwardly against the tension of a connected spring 196 thereby rocking the shutter 193 to permit the reading of the totalizer elements.

It is desirable that the control lever be aligned in its various positions when adjusted and to this end there is attached to the control lever 180 a link 197 (Figs. 13 and 14) which is connected to a segment plate 198 pivoted to the side frame 20 by a stud 199. The segment plate 198 is provided with a plurality of aligning notches 200 adapted to engage a stud carried by a spring-pressed pawl 201. By this means it will be obvious that the control lever is held frictionally in any adjusted position, but by projecting the bolt of a lock 202 which lock is controlled by the insertion of a key through the cabinet 27 the control lever may be locked in any of its adjusted positions. As shown the bolt of lock 202 when projected engages a lug on the pawl 201 and prevents it from rocking as would be required to shift the lever 180.

It is also desirable to lock the amount keys when the control lever is in the "Total and reset" position. For this purpose it will be noted that when the control lever is moved to this position the shaft 181 (Fig. 14) will be rocked counter-clockwise from the position shown and through the spring 190 the locking lever 188 will be moved so that its shoulder 189 passes over the key coupler 39, this action being the same as explained in connection with the "Lock register" position of the control lever with the exception that the lever 188 is rocked still further counter-clockwise.

In order to release the cash drawer when the control lever is moved to the "Total and reset" position it will be noted in this operation that the arm 185 (Fig. 14) will be moved sufficiently to cause a projection 203 formed thereon to contact with a stud 204 carried by the drawer catch release lever 170 rocking it sufficiently so that it will release the cash drawer in exactly the same manner as if the keys were operated. This then constitutes a manual means for releasing the cash drawer independently of an operation of the machine and it may be used for this purpose at a time when the machine may for some reason become disabled and locked up after the coupler has been partially operated. It should be noted in this connection that the control lever may be shifted to the "Total and reset" position even though the coupler is away from normal and at such times the coupler will hold the lever 188 back against the tension of spring 190.

*Resetting devices*

Resetting in the present machine is accomplished in a manner generally known, that is, by manually rotating the shaft 74 so that the square shoulder of a groove 205 (Figs. 6 and 7) formed therein will co-operate with resetting or pick up pawls 206 carried by the totalizer elements. Thus when the shaft 74 is rotated in the proper direction the groove therein will co-operate with the pick-up pawls 206 in whatever positions the latter happen to be and carry them and the connected totalizer elements to their normal positions. It will be noted that the relation between the groove and pawls is such that the wheels of the totalizer are restored by rotation of the shaft 74 in the same direction in which they are driven by the actuators so that by this construction the numeral wheels are free to rotate about the shaft 74 in adding operations without causing any movement of the shaft. As best shown in Figs. 13 and 14, the shaft 74 has connected to it a resetting bar 207 which fits loosely in an aperture formed in a bracket 208 attached to the side frame 20. The connection between the bar 207 and the shaft 74 is formed by inserting the bar in a slot in the shaft and passing a pin through them thus providing a swivel construction and it is such that in the normal position of the parts the totalizer is free to be rocked into and out of mesh with the racks. The cabinet 27 and side plate 20 are both provided with apertures 2081 (Figs. 13 and 16) through which the stem of a resetting key 209 (Fig. 15) is adapted to be inserted so that by the co-operation of a slot 210 formed in the end of the key 209 with the end of the bar 207 the shaft 74 may be rotated to reset the totalizer elements. In all positions of the control lever, with the exception of the "Total and reset" position the aperture 2081 in the plate 20 is closed by an integral portion of the segment plate 198 (Figs. 14 and 16). When the control lever is brought to the "Total and reset" position, however, a cut-away portion 211 will be brought to register with the opening 2081. The plate 198 is formed with bent lugs 212 which are adapted to guide a pin 213 on the reset key. The lugs 212 are also adapted to prevent any rotation of the bar 207 by the resetting key until the key is fully inserted at which time the pin 213 of the key will be in its proper position, within the side plate 20. Rotation of the resetting key will rotate the bar 207 and shaft 74 to zeroize the totalizer elements, it being understood that co-operation of the pin 213 with the side plate 20 will prevent withdrawal of the key until the key is again brought to its normal position.

As previously stated, in resetting operations the totalizer elements are driven by the shaft 74 in the same direction that the actuators drive them. It will therefore be apparent that during the resetting operations the trip pins 115 carried by the wheels will cooperate with the trip palls 117 and trip the latter as in adding operations. For this reason it is necessary to restore the tripped transfer pawls to their normal inactive positions otherwise irregular transfers would be effected during the first subsequent operation of the machine. The shaft 74 as best shown in Fig. 8a has attached thereto a cam 214 which is in the plane of one arm of a bell-crank 216 (Figs. 8a and 9) pivoted on the side member 68 of the totalizer frame. The other arm of the bell-crank 216 carries a pin 217 engaging a bifurcation in an arm 218 attached to a shaft 219 journaled in ears integral with the cross bar 124. A coil spring 220 acting between a fixed stud and the pin 217 urges the arm 216 against the periphery of the cam 214. The shaft 219 is provided with a plurality of slots 221 (Figs 8 and 9) adapted to receive and guide the transfer pawls 120 as well as to restore them after they have been tripped during a resetting operation.

The operation of the foregoing mechanism may now be briefly pointed out. When resetting commences by manual rotation of the inserted resetting key a counter-clockwise rotation of the shaft 74 (Fig. 7) will cause the groove 205 to pick up the variously positioned pawls 206 to restore the totalizer elements. During the counter-clockwise rotation of the shaft 74 the periphery of the cam 214 will co-operate with the arm 216 and gradually rock the latter and through the connections previously described comprising the pin 217 and arm 218 will rock the slotted shaft 219 clockwise (Fig. 8). This rotation of the shaft will carry the slots 221 away from the transfer pawls 120 and will present the outer periphery of the shaft to these pawls tending to rock them slightly upwardly, the lug 121 at this time co-acting with and sliding along the upper rearward edge of the trip pawl 117. When the highest part of the cam 214 contacts the arm 216 the transfer pawls will be elevated to their highest positions and by the continued counter-clockwise rotation of the shaft 74 (Fig. 8a) will reversely rock the bell-crank 216 and the shaft 219 will rock counter-clockwise back to normal thus permitting the transfer pawls 120 to be lowered. At substantially the end of the counter-clockwise rotation of the shaft 74 all of the totalizer elements will be passing from their "9" to their "0" positions at which time the trip pins 115 will co-operate with the trip pawls 117 releasing all the transfer pawls 120 in the same manner that they are released during a regular transfer operation.

At this time rotation of the shaft 74 will be stopped by the co-operation of an integral extension 222 (Figs. 14 and 16) of the bar 207 with a pin 223 carried by the bracket 208. Since the shaft 74 is not given a complete rotation the pin 213 of the resetting key 209 will not be in alignment with the square cut of the notch 2081 (Fig. 16) in the machine side frame 20 so that the resetting key cannot be withdrawn until the shaft 74 is rotated reversely. Reverse rotation of the shaft 74 will, in the form of embodiment shown, restore the tripped transfer pawls, but this operation will have no effect on the totalizer elements which are at this time in their zero positions. As the shaft 74 is thus rotated reversely, or in a clockwise direction, (Fig. 8a) it will rock the shaft 219 first clockwise (Fig. 8) and since at this time the transfer pawls have been released so that their lugs 121 are disengaged from the shoulders 118 and the pawls rest upon the supporting bar 124, the bottom of the slots 221 will have a camming effect upon and will elevate the transfer pawls until the lugs 121 are above the shoulders 118. At this time the transfer trip pawls 116 will be urged by their springs to their normal positions (Fig. 8). When the high part of the cam 214 is reached continued clockwise rotation of the shaft 74 will permit the shaft 219 to be restored to normal, thereby lowering the transfer pawls 120 slightly until the lugs 121 again engage the shoulders 118 of the transfer trip pawls 117. At the termination of the resetting operation the transfer mechanism is again in the position shown in Fig. 8, permitting transferring to be performed in the regular manner and at the end of this operation the resetting key is withdrawn from the machine.

In the description of the totalizer engaging mechanism it was stated that the lug 80 (Figs. 2 and 3) of the segment plate 78 is bent in an angular direction to provide an inclined face or cam portion 94. Without the provision of this inclined portion 94 there is danger that by applying the force of a blow to the keys to operate them slightly, but not sufficiently to bring the full-stroke mechanism into action, it might be possible to rock the key coupler just enough to cause a slight movement of the plate 78 such as would cause the disengagement of the stud 90 from the lug 80. This might permit the totalizer pinions to engage the racks by virtue of the weight of the totalizer frame and parts carried thereby or at least to be forced by hand into mesh. If a resetting operation were then performed the machine might become locked up and disabled. It is for the prevention of misoperations of this type that the camming portion 94 is provided so that upon a slight rocking movement of the plate 78 and its subsequent restoration, the cam portion 94 will be effective to restore the pin 90 and the totalizer back to their normal positions. Or if force is used to carry the totalizer into mesh with the actuators the effect of pin 90 on the camming surface 94 will be to rock the coupler further to an extent sufficient to bring the full stroke mechanism into action. While this is a very simple expedient it is very effective in the performance of the desired function.

Summary of operation

The nature of the improved mechanism is such that in order to make the foregoing description as clear as possible it was necessary to state the operation considerably in detail as an incident to explaining the various features of construction. A complete re-statement here of the operation is therefore believed to be unnecessary. However, a resumé of the general operation of the machine will now be given to co-ordinate the operation and functions of the various parts which have been described in detail.

It will be assumed that the control lever is in the position shown in Fig. 14, namely; the "Open drawer" position and it is desired to enter a transaction of an amount of $1.10. When the keys designated as $1 of the dollars bank and the 10¢ key are depressed the key coupler 39 (Fig. 2) will be rocked clockwise so that its rearward end will engage the notches 38 of the depressed keys. During the initial movement of the key coupler the full-stroke pawl 45 (Fig. 17) will co-act with the ratchet teeth 44 of the plate 41 to prevent retrograde movement of the key coupler. As the keys of the different banks are depressed the rear ends carrying the steps 51 (Fig. 2) will be raised so as to co-operate with the cross bars 48 of their associated differential frames, but prior to this the totalizer elements will be engaged with the actuators by the means which will now be referred to.

As the key coupler is elevated the plate 78 (Fig. 2) will be rocked clockwise permitting the totalizer frame to move downwardly since the pin 90 at this time will be disengaged from the lug 80 and will be forced downwardly by the inclined forward edge of the switching cam plate 85. At this time the totalizer pinions will be meshed with the actuating racks which have not yet been moved. During the continued movement of the plate 78 which retains the totalizer pinions in engagement with the racks by the co-operation of pin 90 with the underside of cam plate 85, the steps 51 (Fig. 2) of the depressed keys through engagement with the cross bars 48 of their associated differential frames will rock the dollars segment 50 and pennies segment 53 (Fig. 4) so as to actuate the corresponding totalizer pinions 76 an amount determined by the value of the key depressed. When the pin 90 (Fig. 2) is moved past the pivot point of the switching cam 85 (Fig. 3) it will rock the latter clockwise against the tension of the spring 86 and toward the end of the down-stroke of the keys the pin 90 will be completely disengaged from the cam plate 85 thereby permitting the spring 86 to rock the cam plate to its normal position and at this time the pin will begin to pass beneath the lug 79.

At substantially the termination of the down-stroke of the keys at which time the differentially operated racks are in their fully adjusted positions the cross rods 57 (Fig. 2) of the differential frames will coact with the steps 58 of the operated keys, thus positively locking the differential frames and segment racks against overthrow.

At the beginning of the return movement of the segment plate 78 (Fig. 2) which is contemporaneous with the return stroke of the keys and rearward camming edge of the switching cam 85 will cam the pin 90 upwardly thereby positively rocking the totalizer frame to disengage the pinions from the segment racks.

During the subsequent portion of the return stroke of the keys the differential frames will be moved positively to their normal positions if they are not returned by their own weight since the rearward arm 60 of each of a number of bell-cranks will be engaged and rocked by the underside of the key coupler 39 and the camming edge of the upwardly extending arm 61 contacting with the related cross rod 57 will positively restore the frame to its normal position.

At the same time, that is, during the continued return movement of the segment plate 78 (Fig. 2) the pin 90 will ride over the upper edge of the cam 85 which thus guides the pin 90 over the lug 80 into the normal position shown in Fig. 2.

When a key of a particular bank is operated the rear end thereof will co-operate with the wedge shaped end of one or more of the adjacent key stops 62 (Fig. 10) thereby oscillating them as well as the rest of the key stops in that group and locking the remaining keys. By this construction it is not possible to operate more than one key in a group.

If during a totalizing operation a totalizer wheel of a lower order passes through nine to the zero position the pin 115 (Fig. 8) will rock the transfer trip pawl 117 forwardly disengaging the shoulder 118 from the lug 121 of the pawl 120 and permitting the coil spring 128 to urge the transfer pawl downwardly until the end of the pawl is in engagement with one of the teeth of the ratchet wheel attached to the next higher order wheel. During the downward stroke of the keys the several cams 127 (Fig. 7) carried by the transfer shaft 97 co-operating with the pins 129 will rock the links 126 upwardly until the cams all clear the pins whereupon the links 126 will drop to their normal positions being assisted in this movement by the spring-urged bail 132. During the return stroke of the keys the cams 127 will engage the opposite sides of the pins 129, thereby forcing the related transfer links 126 forwardly and actuating the associated transfer pawls 120 so that those which may have been dropped into active position will effect the necessary transfers.

When the keys of the different banks are depressed and as the rear ends thereof rise they will co-operate with the stems of their associated indicators 140 (Fig. 10) thereby raising them to their upper or visible position. During the downward stroke of the keys the extension 154 (Fig. 17) of the coupler supporting plate 41 co-operating with the lug 153 will force the member 151 forwardly rocking the cross bail 146 so as to disengage the fingers 150 from the portions 145 of the previously raised indicators permitting the latter to drop to their normal positions. Near the termination of the down-stroke of the keys the new related indicators 140 will have reached such positions that the portions 145 thereof are above the co-operating fingers 150, and at this time the extension 154 will pass out of engagement with the lug 153 permitting the tension in the spring 155 to force the member 151 quickly rearwardly and thereby rocking the retaining bar 146 so that thereafter as the key returns to normal the fingers 150 project into the lower slots 144 of the lifted indicators beneath the portions 145 thereby holding the indicators elevated. The remaining fingers 150 will, of course, return to their positions in the upper slots 143 of the unexposed indicators.

Also during the downward stroke of the keys as the plate 41 (Fig. 17) is rocked counter-clockwise the pin 162 co-operating with the upper surface of the lug 161 will rock the bell hammer 159 clockwise against the tension in the spring 160, and when the lug 161 is disengaged from the pin 162 it will permit the spring 160 to rock the bell hammer 159 so that the hammer portion will strike the bell 158. During the return movement of the keys the pin 162 will co-act with the underside of the lug 161 but will not cause the hammer to strike the bell at this time.

Another operation which takes place during the downward stroke of the keys when the key coupler 39 is being elevated is the passage of the trip pin 168 (Fig. 14) by the pawl 169 without effecting any movement of the drawer release lever 170 or the drawer catch 172. However, on the return movement of the key coupler, the trip pin will engage the upper edge of the pawl 169 thereby rocking the drawer catch release lever 170 and disengaging the shoulder 171 from the drawer catch which permits the spring 1761 to be effective to force the cash drawer outwardly in order that the money received may be placed in it.

At the end of the operation of the machine as just described, it will be obvious that the desired amount is registered upon the totalizer and that the amount is publicly indicated. Furthermore, in the position of the control lever assumed, namely "Open drawer" position, subsequent entries of items may be permitted without requiring the cash drawer to be returned to its normal position since at this time the rear edge of the downward extension of the arm 185 (Fig. 14) will engage the lug 186 to hold the locking arm 182 to the rear and prevent the shoulder of the latter from moving over the key coupler even when the cash drawer is opened.

When it is desired to operate the machine the other way, that is, to produce what may be termed "Closed drawer" operations of the machine, the control lever is first unlocked by withdrawing the control lever to be moved to the "Closed drawer" position. This movement of the control lever one step rearwardly will rock the shaft 181 enough to permit the arm 185 to move forwardly one step away from the lug 186 so as to allow the shoulder 183 of the locking arm 182 to pass over the key coupler when the cash drawer is exposed. When the cash drawer is returned to its normal inner position the drawer plate 174 contacting with the lower end of the arm 182 will shift it to the rear to unlock the key coupler and permit subsequent operation of the keys.

If it is desired to lock the machine during the absence of the proprietor or for other reasons the control lever may be moved to the "Lock register" position at which time a rocking movement will be given to the shaft 181 enough to cause the spring 190 (Fig. 14) connected at one end to an extension 187 of arm 185 to move the bell-crank 188 so that its shoulder 189 passes over the key coupler 39 thereby locking the keys and preventing release of the cash drawer if and when the latter is returned to its inner position.

At the close of a day's business or any arbitrary period if it is desired to obtain the totals of the amounts registered and to check the receipts for the day, the control lever may be moved to the rearmost or "Total and reset" position. When the control lever is adjusted to this position the arm 194 also secured to the shaft 181 will contact with the end of the slot in the link 195 and will rock the shutter 193 (Fig. 2) so that the totalizer elements may be viewed through the window 191 formed in the cabinet as well as apertures formed in the designating plate 192.

When the control lever is moved to the "Total and reset" position and the shaft 181 is correspondingly rocked the spring 190 (Fig. 14) attached to the arm 185 will cause the locking lever 188 to be moved so that its shoulder 189 passes over the key coupler 39 thereby locking the keys when the control lever is in this position just as when it is in the "Lock register" position.

Movement of the control lever to the "Total and reset" position will cause the rocking of the plate 198 to such an extent that the opening or cut away portion 211 formed therein will be brought in line with the openings 2081 in the cabinet as well as frame member 20. This makes it possible to insert the key 209 by passing the pin 213 between the projections 212 and through the elongated portions of the openings. The slot 210 in the end of the key will, when the latter is fully inserted, engage the end of the bar 207 so that turning of the key will impart rotary movement to the totalizer wheel supporting shaft 74. To effect the resetting of the totalizer elements, the key as well as bar 207 will be rotated in a counter-clockwise direction, Fig. 14, until the upstanding portion 222 of the bar engages the pin 223. This will occur before the shaft is given quite a complete revolution. To turn the shaft in this manner will cause the groove 205 therein to pick up the pawls 206 carried by the several totalizer wheels in whatever positions they may happen to be located and will carry them all to zero. This movement of the wheels is in the forward direction, i. e. the same direction in which they are turned for addition. For this reason the pins 115 carried by the wheels will cooperate with the transfer trip pawls 117 and will trip all of the transfer pawls 120 into active position toward the end of the counter-clockwise rotation of the shaft 74. Means are therefore provided to restore these transfer pawls 120 to their inactive positions so that they will not effect an erroneous carrying operation upon the first subsequent operation of the machine. To accomplish this result, a cam member 214 is mounted on the shaft 74 and is adapted to rock the two armed lever 216, which through a pin and slot connection serves to rock an arm 218 secured to the shaft 219. The latter is provided with a series of notches or slots 221 in which the several pawls normally rest, but when the shaft is turned these notches are carried away from the pawls and the outer periphery of the shaft will tend to cam all of them to a position slightly beyond that in which the lugs 121 cooperate with shoulders 118. Upon the return movement of the shaft 219 the proper normal relation between the transfer and trip pawls will then be assumed. It will be apparent that the cam 214 will rock the two armed lever 216 on both the counter-clockwise and the return or clockwise rotation of the shaft 74, but it is the latter movement which serves to restore all of the tripped transfer pawls since they will not have been tripped previous to the first rocking of the member 216. Due to the co-operation of the pin 213 with the side of plate 20 it is impossible to withdraw the resetting key until the shaft 74 is fully returned to its normal position.

Movement of the control lever to the "Total and reset" position will, through the projection 203 (Fig. 14) of the arm 185 contacting with the pin 204, rock the drawer catch release lever 170 and permit the cash drawer to be released in the usual manner. As previously stated, the cash drawer may be released in this way even though the key coupler 39 may be partially elevated by the depression of the keys and held in such position as when the machine is disabled or locked up in the middle of an operation. In this case the locking lever 188 will be held against the rearward end of the key coupler so that movement of the control lever to the "Total and reset" position will merely tension the spring 190 but it will still permit the engagement of the projection 203 with the stud 204 to release the cash drawer.

While the form of mechanism herein described is admirably adapted to fulfill the objects primarily stated, it is to be understood that it is not intended to confine the invention to the one form of embodiment herein shown, since it may be embodied in various forms, all coming within the scope of the claims which follow:

What is claimed is:

1. In a machine of the class described, the combination of a plurality of keys, a pair of projections on each of said keys, said projections being formed as two sets of complementally arranged steps, and a frame adapted to co-operate with the projections of any one of said keys whereby the frame is differentially and positively operated and arrested.

2. In a machine of the class described, the combination of a plurality of keys, a pair of projections on each of said keys, said projections being formed as two sets of complementally arranged steps, a frame adapted to co-operate with the projections of any one of said keys whereby the frame is differentially and positively adjusted by the keys, and an accounting device driven by the frame.

3. In a machine of the class described, the combination of a plurality of keys, a shaft, a key coupler pivoted on the shaft and arranged for co-operation with the keys, and a frame pivoted upon the shaft and adapted to co-operate with the keys so as to be differentially operated thereby.

4. In a machine of the class described, the combination of a plurality of keys provided with steps differentially arranged, a shaft, a key coupler pivoted on the shaft and arranged for co-operation with the keys, and a frame pivoted upon the shaft adapted to co-operate with the steps on the keys to be differentially adjusted thereby.

5. In a machine of the class described, the combination of a plurality of keys, two projections provided on each of said keys, the two sets of projections on said keys being differentially arranged, a shaft, a key coupler pivoted on the shaft and arranged for co-operation with the keys, and a frame pivoted upon the shaft having means on opposite sides of its pivot arranged to co-operate with the sets of projections to be differentially adjusted thereby.

6. In a machine of the class described, the combination of a plurality of keys, a shaft, a key coupler carried by the shaft and arranged for co-operation with the keys, a frame pivoted upon the shaft, and means carried by the keys adapted to operate the frame differentially and to prevent overthrow of the frame.

7. In a machine of the class described, the combination of a plurality of keys, a projection formed on each of said keys, said projections of the plurality of keys being differentially graded, a second series of projections one on each of said keys and also differentially graded, said second series of projections being complemental with respect to the first mentioned projections, and a frame adapted to co-operate with both series of projections so as to be differentially adjusted thereby.

8. In a machine of the class described, the combination of a plurality of keys, projections on said keys, said projections of the plurality of keys being arranged as differentially graded steps, a frame adapted to coact with the steps to differentially position the frame when the keys are depressed, a key coupler, and camming means operated by the key coupler to positively restore the frame to normal after it has been operated.

9. In a machine of the class described, the combination of a plurality of keys, projections on said plurality of keys arranged as differentially graded steps, a frame co-operating with the steps so as to be differentially operated thereby, means carried by the keys co-operating with the frame to prevent overthrow of the latter, an operating mechanism, and means operated by the operating mechanism for positively returning the frame to normal.

10. In a machine of the class described, the combination of key coupler, totalizer operating mechanism, a pivoted totalizer frame, a segment plate rockable by the key coupler, a member intermediate the totalizer frame and said segment plate, and means comprising a pivoted cam plate carried by the segment plate adapted to rock the totalizer frame into and out of engagement with the totalizer operating mechanism through the intermediate member.

11. In a machine of the class described, the combination of totalizer operating mechanism, a pivoted totalizer frame, a segment plate carrying a switching pivoted cam plate adapted to rock the totalizer frame into and out of engagement with the totalizer operating mechanism, and means for positively rocking the switching cam plate in both directions.

12. In a machine of the class described, the combination of totalizer operating mechanism, a pivoted totalizer frame, a segment plate carrying a switching pivoted cam plate adapted to rock the totalizer frame into and out of engagement with the totalizer operating mechanism, a spring for rocking the switching cam plate and means independent of the spring for positively rocking the cam plate in the same direction.

13. In a cash register, the combination of an operating mechanism, a segment rockable thereby, a plate pivoted upon the segment, a pivoted totalizer frame, and a switching cam plate carried by the pivoted plate and adapted to rock the totalizer frame about its pivot.

14. In a cash register, the combination of an oscillating member, a totalizer frame, a pivoted switching cam plate carried by the member and adapted to rock the totalizer frame when the member is oscillated, and stops for the cam plate adapted to limit the pivotal movement of the cam plate.

15. In a cash register, the combination of an oscillatable member, a totalizer frame, a pivoted switching cam plate carried by the member and adapted to rock the totalizer frame when the member is oscillated, stops for the cam plate to limit the pivotal movement of the latter, and means for positively rocking the cam plate in either direction.

16. In a machine of the class described, the combination of a totalizer frame, an oscillating member, and means carried thereby adapted to rock the totalizer frame in opposite directions and to lock the totalizer frame in its moved position at the termination of the movement of the member in either direction.

17. In a machine of the class described, the combination of a totalizer frame, means for normally locking it against movement, an oscillating member and means carried thereby adapted to positively rock the totalizer frame in opposite directions and to lock the totalizer frame in its moved position at the termination of the movement of the member in one direction.

18. In a machine of the class described, the combination of a rockable totalizer frame, means for limiting its rocking movement and for positively locking it in its normal position, and an oscillating member carrying means adapted to positively rock the frame in opposite directions.

19. In a machine of the class described, the combination of a rockable totalizer frame, means for limiting its rocking movement and for positively locking it in its normal position, an oscillating member carrying means adapted to positively rock the frame in opposite directions, and including means for locking the totalizer frame at the termination of its movement in one direction.

20. In a cash register, the combination of a normally positively locked totalizer frame, an oscillating member, means carried thereby adapted to rock the totalizer frame in both directions, said means including cam means operable during the initial movement of the member to release and move the totalizer frame.

21. In a machine of the class described, a key coupler, a plate adapted to be oscillated by said coupler, a rockable totalizer frame, means carried by said plate adapted to positively rock the frame in opposite directions, and means on said plate adapted to positively hold the frame when the plate is in either of its extreme positions.

22. In a machine of the class described, a key coupler, a plate adapted to be oscillated by said coupler, a rockable totalizer frame, means carried by said plate adapted to positively rock the frame in opposite directions, means on said plate adapted to positively hold the frame when the plate is in either of its extreme positions, and one of said means being adapted to rock the frame upon certain operations of the plate.

23. In a machine of the class described, a key coupler, a plate adapted to be oscillated by said coupler, a rockable totalizer frame, means carried by said plate adapted to positively rock the frame in opposite directions, means on said plate adapted to positively hold the frame when the plate is in either of its extreme positions, and a projection on said means carried by said plate whereby said means may be rocked as the plate reaches one of its extreme positions.

24. In a machine of the class described, of a totalizer operating mechanism, a pivoted totalizer frame, a segment plate carrying a switching pivoted cam plate, adapted upon movement of the segment plate in one direction to rock the totalizer frame into engagement with the totalizer operating mechanism and when moved in the opposite direction by said segment plate to rock the totalizer frame out of engagement with said operating mechanism, means for limiting the movement of the totalizer frame in either direction a projection carried by said last mentioned means cooperating with a lug on said segment plate to positively lock the totalizer frame in normal position, and a second lug carried by said segment plate adapted to cooperate with said projection to positively lock the totalizer frame in operated position.

CHARLES W. GREEN.